US011915638B2

(12) United States Patent
Yuan

(10) Patent No.: US 11,915,638 B2
(45) Date of Patent: Feb. 27, 2024

(54) DISPLAY PANEL AND DISPLAY DEVICE

(71) Applicant: Shanghai Tianma Micro-Electronics Co., Ltd., Shanghai (CN)

(72) Inventor: Yong Yuan, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/106,792

(22) Filed: Feb. 7, 2023

(65) Prior Publication Data

US 2023/0186841 A1 Jun. 15, 2023

Related U.S. Application Data

(63) Continuation of application No. 17/453,170, filed on Nov. 1, 2021, now Pat. No. 11,605,336.

(30) Foreign Application Priority Data

Mar. 16, 2021 (CN) ......................... 202110280448.3

(51) Int. Cl.
*G09G 3/32* (2016.01)
*G09G 3/3208* (2016.01)
(Continued)

(52) U.S. Cl.
CPC ............. *G09G 3/32* (2013.01); *G09G 3/3208* (2013.01); *G09G 3/3241* (2013.01); *G09G 3/325* (2013.01);
(Continued)

(58) Field of Classification Search
CPC .......... G09G 3/30; G09G 3/32; G09G 3/3208; G09G 3/3225; G09G 3/3241;
(Continued)

(56) References Cited

U.S. PATENT DOCUMENTS 6,859,193 B1 2/2005 Yumoto
7,629,611 B2 12/2009 Kazutaka
(Continued)

FOREIGN PATENT DOCUMENTS

CN 100386794 C 5/2008
CN 105702210 A 6/2016
(Continued)

*Primary Examiner* — Jason M Mandeville
(74) *Attorney, Agent, or Firm* — Anova Law Group, PLLC

(57) ABSTRACT

A display panel and a display device are provided. The display panel includes a pixel circuit and a light-emitting element. The pixel circuit includes a data-writing module, a driving module, and a compensation module. The data-writing module is configured to selectively provide a data signal for the driving module. The driving module includes a driving transistor and is configured to provide a driving current to the light-emitting element. The compensation module is configured to compensate a threshold voltage of the driving transistor. A source of the driving transistor includes a first source and a second source, and a drain of the driving transistor includes a first drain and a second drain. A third driving portion is arranged between the first source and the second source. A first driving portion is arranged between the second source and the first drain.

16 Claims, 8 Drawing Sheets

(51) Int. Cl.
*G09G 3/3241* (2016.01)
*G09G 3/3233* (2016.01)
*G09G 3/325* (2016.01)

(52) U.S. Cl.
CPC ... *G09G 3/3233* (2013.01); *G09G 2310/0275* (2013.01); *G09G 2320/0233* (2013.01); *G09G 2320/0247* (2013.01); *G09G 2320/045* (2013.01)

(58) Field of Classification Search
CPC ................. G09G 3/3233; G09G 3/325; G09G 2310/0251; G09G 2310/0275; G09G 2320/0233; G09G 2320/0247; G09G 2320/045; G09G 2300/0842
USPC .................................................... 345/76, 690
See application file for complete search history.

(56) References Cited

U.S. PATENT DOCUMENTS

| | | | | |
|---|---|---|---|---|
| 8,692,740 | B2 | 4/2014 | Yoshida et al. | |
| 9,331,300 | B2 * | 5/2016 | Moon | H10K 59/123 |
| 10,417,958 | B2 * | 9/2019 | Chung | G09G 3/3233 |
| 11,222,909 | B2 | 1/2022 | Zhou | |
| 11,245,041 | B2 * | 2/2022 | Oh | H01L 29/41733 |

FOREIGN PATENT DOCUMENTS

| | | | |
|---|---|---|---|
| CN | 111210771 | A | 5/2020 |
| IN | 109599064 | A | 4/2019 |

* cited by examiner

DISPLAY PANEL AND DISPLAY DEVICE

CROSS-REFERENCE TO RELATED APPLICATIONS

This application is a continuation of application Ser. No. 17/453,170, filed on Nov. 1, 2021, which claims the priority of Chinese patent application No. 202110280448.3, filed on Mar. 16, 2021, the entirety of all of which is incorporated herein by their references.

FIELD

The present disclosure generally relates to the field of display technology and, more particularly, relates to a display panel and a display device.

BACKGROUND

With the continuous development of display technology, emerging display-related technologies continue to emerge. Self-luminous display panels such as an organic light-emitting diode (OLED) display panel and a micro light-emitting diode (micro LED) display panel, etc., have gradually been favored by consumers, and have become a research hotspot.

In the OLED display panel and the micro LED display panel, a pixel circuit that provides a driving current for a light-emitting element is a crucial element. In the pixel circuit, a driving transistor generates the driving current, and is one of key components. On the one hand, the driving transistor needs to have desired driving capability, and on the other hand, the driving transistor needs to avoid generating signal error when the display panel switches a screen to the greatest extent, to ensure that the generated driving current is as accurate as possible, and to ensure the display effect of the display panel. Therefore, how to reduce the signal error when the display panel switches the screen under the premise of ensuring the driving capability of the driving transistor is an urgent technical problem that needs to be solved.

SUMMARY

One aspect of the present disclosure provides a display panel. The display panel includes a pixel circuit and a light-emitting element. The pixel circuit includes a data-writing module, a driving module, and a compensation module. The data-writing module is configured to selectively provide a data signal for the driving module. The driving module includes a driving transistor and is configured to provide a driving current to the light-emitting element. The compensation module is configured to compensate a threshold voltage of the driving transistor. A source of the driving transistor includes a first source and a second source, and a drain of the driving transistor includes a first drain and a second drain. A third driving portion is arranged between the first source and the second source. A first driving portion is arranged between the second source and the first drain. A second driving portion is arranged between the first drain and the second drain. The data writing module is connected to the second source, and the compensation module is connected between the gate and the first drain.

Another aspect of the present disclosure provides a display device including a display panel. The display panel includes a pixel circuit and a light-emitting element. The pixel circuit includes a data-writing module, a driving module, and a compensation module. The data-writing module is configured to selectively provide a data signal for the driving module. The driving module includes a driving transistor and is configured to provide a driving current to the light-emitting element. The compensation module is configured to compensate a threshold voltage of the driving transistor. A source of the driving transistor includes a first source and a second source, and a drain of the driving transistor includes a first drain and a second drain. A third driving portion is arranged between the first source and the second source. A first driving portion is arranged between the second source and the first drain. A second driving portion is arranged between the first drain and the second drain. The data writing module is connected to the second source, and the compensation module is connected between the gate and the first drain.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

Figure 1:
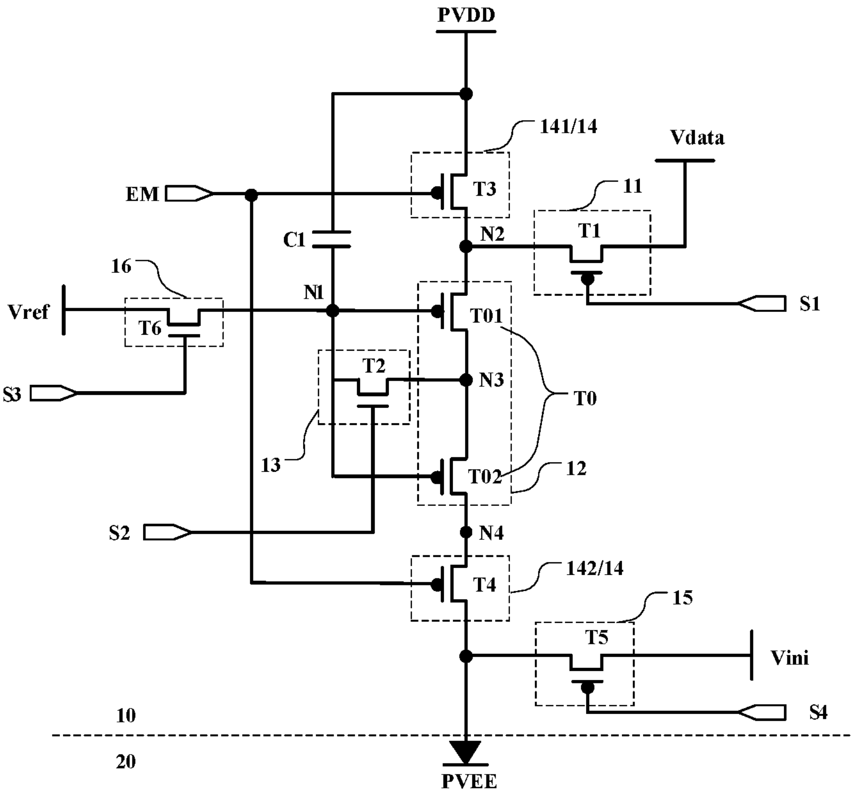
FIG. 1 illustrates a schematic diagram of a pixel circuit of an exemplary display panel consistent with disclosed embodiments of the present disclosure.
Figure 2:
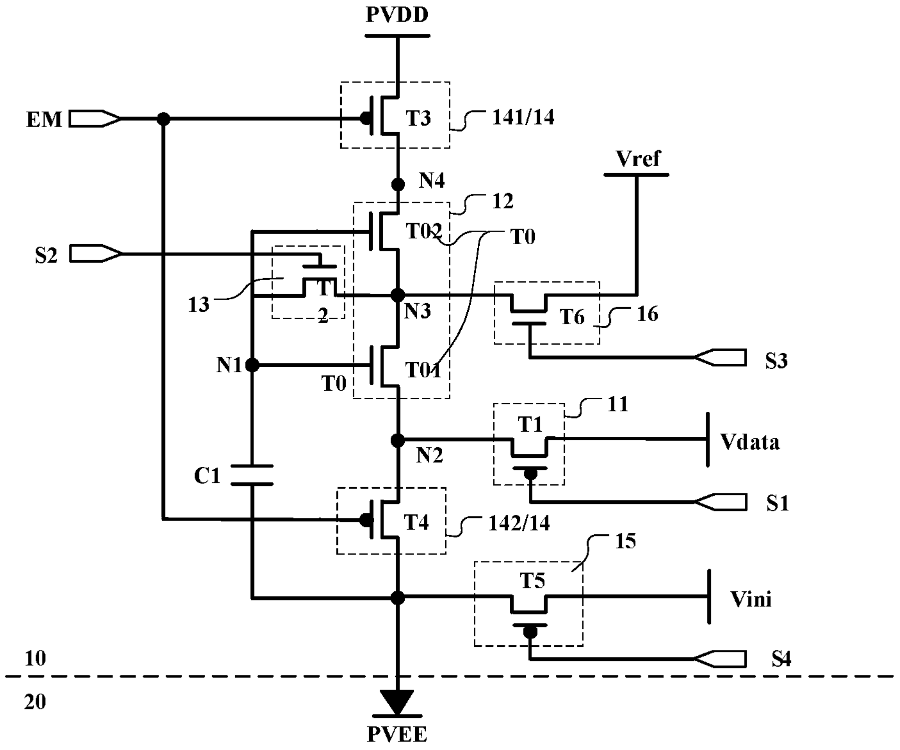
FIG. 2 illustrates a schematic diagram of a pixel circuit of another exemplary display panel consistent with disclosed embodiments of the present disclosure.
Figure 3:
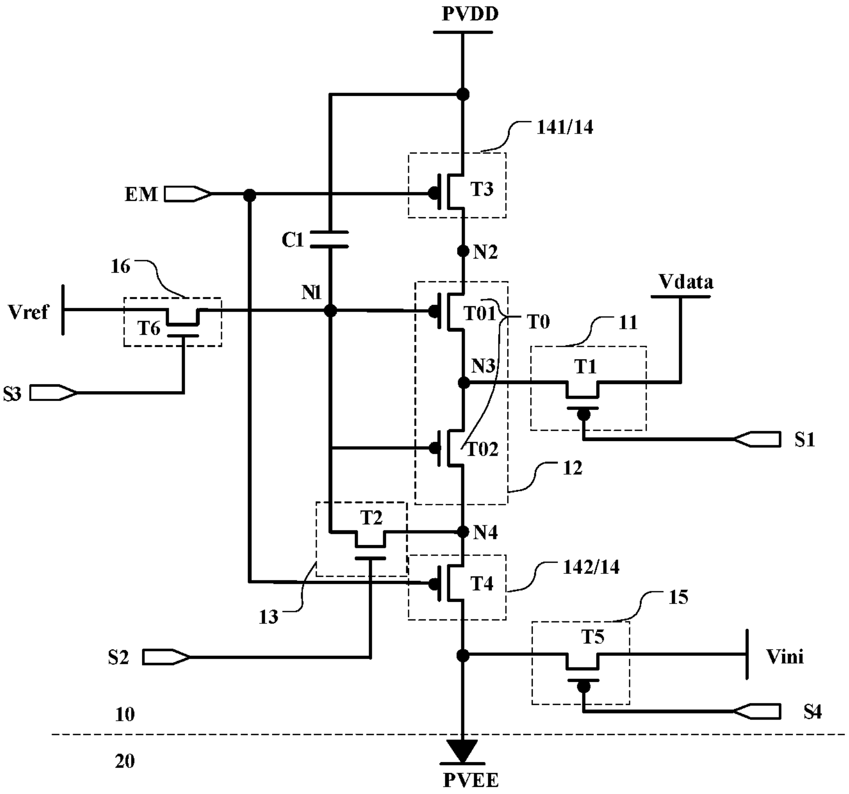
FIG. 3 illustrates a schematic diagram of a pixel circuit of another exemplary display panel consistent with disclosed embodiments of the present disclosure.
Figure 4:
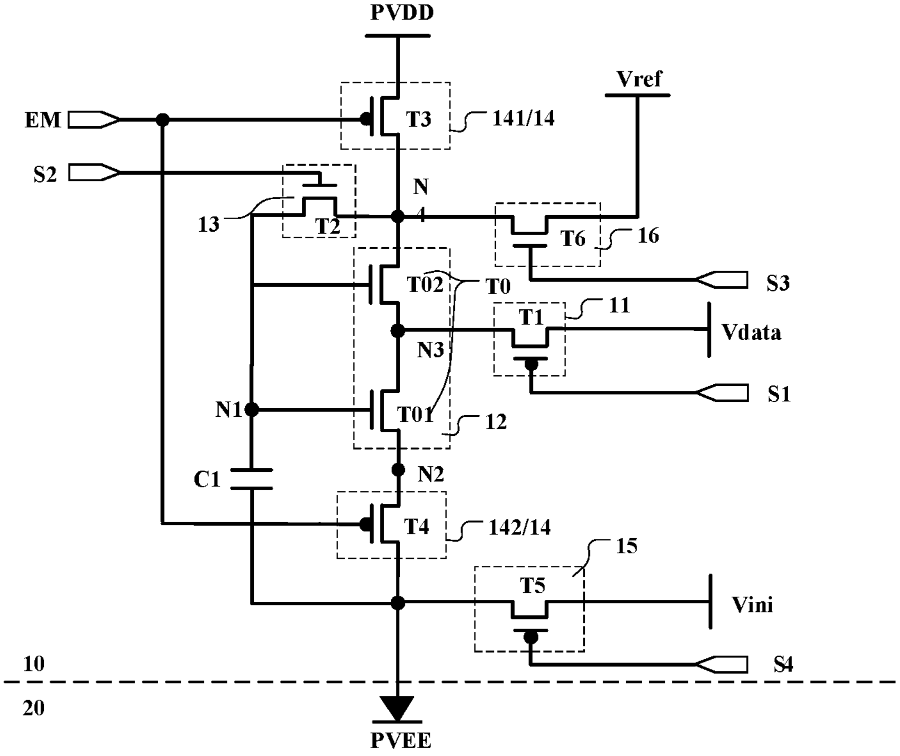
FIG. 4 illustrates a schematic diagram of a pixel circuit of another exemplary display panel consistent with disclosed embodiments of the present disclosure.
Figure 5:
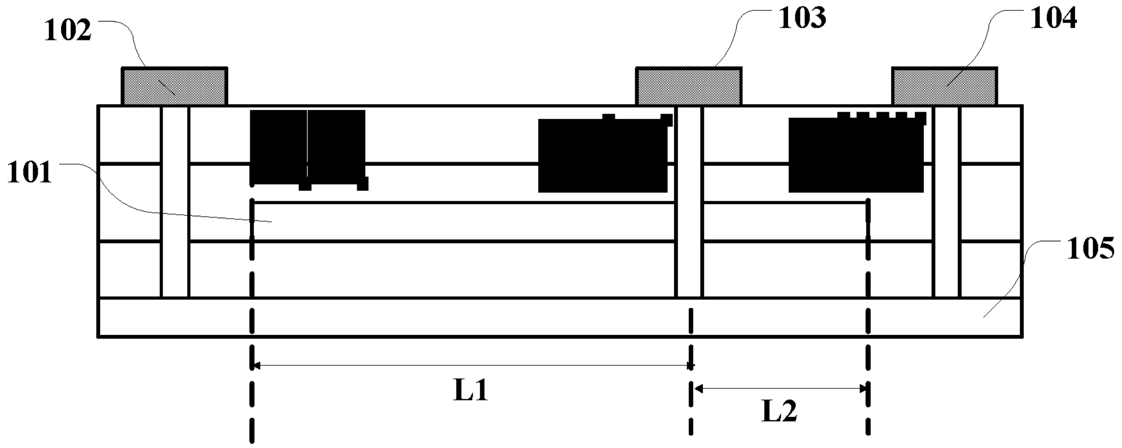
FIG. 5 illustrates a schematic cross-sectional view of a driving transistor consistent with disclosed embodiments of the present disclosure.

The present disclosure provides a display panel. FIG. 1 illustrates a schematic diagram of a pixel circuit of a display panel consistent with disclosed embodiments of the present disclosure; FIG. 2 illustrates a schematic diagram of a pixel circuit of another display panel consistent with disclosed embodiments of the present disclosure; FIG. 3 illustrates a schematic diagram of a pixel circuit of another display panel consistent with disclosed embodiments of the present disclosure; FIG. 4 illustrates a schematic diagram of a pixel circuit of another display panel consistent with disclosed embodiments of the present disclosure; FIG. 5 illustrates a schematic cross-sectional view of a driving transistor consistent with disclosed embodiments of the present disclosure; and FIG. 6 illustrates a schematic cross-sectional view of another driving transistor consistent with disclosed embodiments of the present disclosure.

Referring to FIGS. 1-6, the display panel may include a pixel circuit 10 and a light-emitting element 20. The pixel circuit 10 may include a data-writing module 11, a driving module 12, and a compensation module 13. The data-writing module 11 may be configured to selectively provide a data signal for the driving module 12. The driving module 12 may be configured to provide a driving current for the light-emitting element 20, and the driving module 12 may include a driving transistor T0. The compensation module 13 may be configured to compensate a threshold voltage of the driving transistor T0. The driving transistor T0 may include a source 102 (node N2), a gate 101 (node N1), an active layer 105, a first drain 103 (node N3) and a second drain 104 (node N4). A first driving portion T01 may be disposed between the source 102 and the first drain 103, and a second driving portion T02 may be disposed between the first drain 103 and the second drain 104. A length of a channel region of the first driving portion T01 may be L1, and a length of a channel region of the second driving portion T02 may be L2.

In one embodiment, referring to FIG. 1 and FIG. 2, the data-writing module 11 may be connected to the source 102, and the compensation module 13 may be connected between the gate 101 and the first drain 103. In another embodiment, referring to FIG. 3 and FIG. 4, the data-writing module 11 may be connected to the first drain 103, and the compensation module 13 may be connected between the gate 101 and the second drain 104. For the pixel circuit associated with FIGS. 1-2, $L2/L1 \geq \Delta Vsd2/(\Delta Vsg+V0)-1$ and $0 \leq V0 \leq \Delta Vgd2 \times 1/2$; alternatively, for the pixel circuit associated with FIGS. 3-4, $L1/L2 \geq \Delta Vsd2/(\Delta Vgd2+V0)-1$ and $0 \leq V0 \leq \Delta Vsg \times 1/2$, where $\Delta Vsd2=|Vs-Vd2|$, $\Delta Vsg=|Vs-Vg|$, and $\Delta Vgd2=|Vg-Vd2|$. In a light-emitting stage of the light-emitting element 20, Vs may be a voltage of the source of the driving transistor, Vd2 may be a voltage of the second drain of the driving transistor, and Vg may be a voltage of the gate of the driving transistor.

Figure 6:
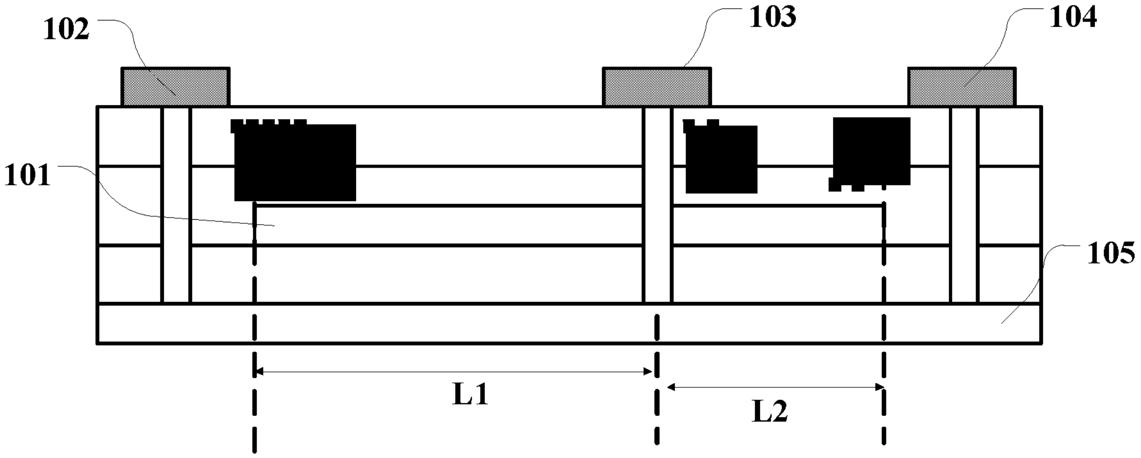
FIG. 6 illustrates a schematic cross-sectional view of another driving transistor consistent with disclosed embodiments of the present disclosure.

Referring to FIG. 5 and FIG. 6, in a light-emitting stage of the light-emitting element 20, because the driving transistor T0 generates a driving current for the light-emitting element 20 in the light-emitting stage, the gate 101 of the driving transistor T0 may store a data signal required for emitting light. The transistor may often operate in an unsaturated state, the voltages of the source 102 and the second drain 104 may not be equal, and the voltage difference may be substantially large. In view of this, the voltage difference between the gate 101 and the source 102 may not be equal to and may be significantly different from the voltage difference between the gate 101 and the second drain 104. When the voltage difference between the gate 101 and the source 102 is significantly different from the voltage difference between the gate 101 and the second drain 104, for the side with a larger voltage difference, because the electric field is strong, carriers may migrate under the action of the strong electric field, and may be easily trapped by defects to form a built-in electric field and generate polarization. Such phenomenon may cause the Vd-Ig curve of the driving transistor T0 to be deviated, and may cause a deviation of a threshold voltage. For example, when the threshold voltage of the driving transistor T0 is Vth and the deviation is ΔV, the deviated threshold voltage may be Vth±ΔV.

It should be noted that arrows in FIG. 5 and FIG. 6 may indicate the density of electric field lines between the source and the gate, between the first drain and the gate, and between the second drain and the gate. The density of the electric field lines may exemplarily illustrate the strength of the electric field, and directions of the arrows may be adjusted according to the specific situation.

Figure 7:
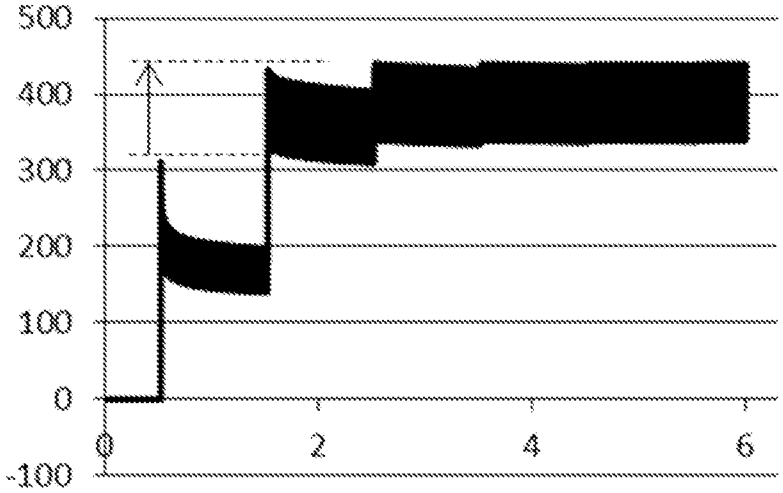
FIG. 7 illustrates a diagram of a relationship between brightness and a quantity of refreshed frames when a display panel refreshes a screen.

FIG. 7 illustrates a diagram of a relationship between brightness and a quantity of refreshed frames when a display panel refreshes a screen, where the ordinate may be the brightness of the light-emitting element 20, and the abscissa may be the quantity of the refreshed frames. Referring to FIG. 7, the starting point may stands starting from a screen with a substantially small driving current (referred to a black screen, which may actually be a light-emitting stage with a substantially small light-emitting current), and the brightness at the starting point may be close to 0. When refreshing the screen, the expected brightness may be 450 nits. After the first frame data is refreshed, the actual brightness may first reach 300 nits and then may drop to a certain extent, and, thus, may not reach the expected brightness.

When the screen is switched, due to the deviation of the threshold voltage of the driving transistor in the previous light-emitting period, the threshold voltage of the driving transistor may be deviated to Vth±ΔV. In a data-writing stage, the deviation of the threshold voltage may cause the data signal Vdata written to the gate of the driving transistor to be unstable, and Vdata may not reach an accurate value, such that after the first frame is refreshed, the actual brightness may not reach the expected brightness.

When the second frame data is refreshed, the actual brightness may first reach 450 nits, while may drop to a certain extent. When the second frame data is refreshed, the voltages of the source, the gate, and the drain of the driving transistor in the light-emitting stage may be changed in the data-writing stage. The deviation of the threshold voltage $\Delta V$ may be gradually improved by writing data twice, and, thus, $\Delta V$ may become smaller and smaller, and the threshold voltage may tend to be stabilized. With respect to refreshing the first frame data, when refreshing the second frame data, the data signal Vdata may be more accurate, and the actual brightness may be close to a target brightness. When the third frame data is refreshed, the deviation of the threshold voltage may be further improved, and, thus, $\Delta V$ may become smaller and smaller, the threshold voltage may be stabilized, the written data signal Vdata may be substantially accurate, and the actual brightness may be substantially close to the target brightness. After refreshing data multiple times, the brightness may gradually reach the target brightness.

However, when the quantity of refreshed frames is substantially large, eye may perceive the brightness change, which may cause a flickering problem when switching the display screen. Therefore, the quantity of refreshed frames required to reach the target brightness may need to be reduced as much as possible. The quantity of refreshed frames may be related to the deviation of the threshold voltage of the driving transistor, and the smaller the deviation of the threshold voltage $\Delta V$, the easier the brightness reaching the target brightness.

The voltage difference between the gate 101 and the source 102 may be significantly different from the voltage difference between the gate 101 and the second drain 104, which may be one of main reasons that cause the deviation of the threshold voltage $\Delta V$. Therefore, in the present disclosure, the driving transistor T0 may be divided into two portions: the first driving portion T01 and the second driving portion T02. Among the first driving portion T01 and the second driving portion T02, whoever of the first driving portion T01 or the second driving portion T02 has a larger voltage difference, causes the deviation of the threshold voltage, and causes the unstable written data signal, may not be connected in the data-writing stage, and whoever of the first driving portion T01 or the second driving portion T02 has a smaller voltage difference may be connected, which may improve the accuracy of the written data signal as much as possible.

In the light-emitting stage of the light-emitting element 20, when the voltage difference between the first drain 103 and the gate 101 is less than a certain voltage value V0, where $0 \le V0 \le \Delta Vgd2 \times 1/2$ or $0 \le V0 \le \Delta Vsg \times 1/2$, in other words, when the voltage difference between the first drain 103 and the gate 101 is reduced to half of the voltage difference between the gate 101 and the second drain 104, or half of the voltage difference between the gate 101 and the source 102, the portion with a greater electric field strength may not participate in the data-writing stage, to ensure that the expected brightness may be reached as soon as possible when refreshing the screen.

Therefore, in the present disclosure, the driving transistor T0 may be divided into two portions: the first driving portion T01 and the second driving portion T02. The first driving portion T01 may be a portion between the source 102 and the first drain 103, and the second driving portion T02 may be a portion between the first drain 103 and the second drain 104. The length of the channel region of the first driving portion T01 may be L1, and the length of the channel region of the second driving portion T02 may be L2. When the voltage difference between the first drain 103 and the gate 101 is less than the certain voltage value V0, i.e., when $|Vg-Vd1| \le V0$, $Vg-V0 \le Vd1 \le Vg+V0$.

Referring to FIG. 1 and FIG. 2, when the first driving portion is selected to participate in the data-writing stage, the data-writing module 11 may be connected to the source 102, and the compensation module 13 may be connected between the gate 101 and the first drain 103. Because $|Vs-Vd1| \approx |Vs-Vd2| \times L1/(L1+L2)$, when $Vs \ge Vd1$, $(Vs-Vg)-V0 = Vs-(Vg+V0) \le Vs-Vd1 = |Vs-Vd1| \le Vs-(Vg-V0) = (Vs-Vg)+V0$; or when $Vs \le Vd1$, $(Vg-Vs)-V0 = Vg-V0-Vs \le Vd1-Vs = |Vs-Vd1| \le Vg-Vs+V0 = (Vg-Vs)+V0$. Because $(Vs-Vg) \le |Vs-Vg|$ and $(Vg-Vs) \le |Vs-Vg|$, $|Vs-Vd1| \le |Vs-Vg|+V0$, in other words, $|Vs-Vd2| \times L1/(L1+L2) \le |Vs-Vg|+V0$. Therefore, $L2/L1 \ge |Vs-Vd2|/[|Vs-Vg|+V0]-1 = \Delta Vsd2/(\Delta Vsg+V0)-1$.

According to the above calculation, the values of the lengths L1 and L2 may affect the voltage difference between the first drain 103 and the gate 101. When $L2/L1 \ge \Delta Vsd2/(\Delta Vsg+V0)-1$ and $0 \le V0 \le \Delta Vgd2 \times 1/2$, it may be ensured that the voltage difference between the gate 101 and the first drain 103 may be less than half of the voltage difference between the gate 101 and the second drain 104, which may avoid the problems where the inputted data signal is inaccurate and the brightness is difficult to reach the expected brightness when the screen is refreshed due to too large voltage difference between the gate 101 and the second drain 104.

Similarly, referring to FIG. 3 and FIG. 4, when the second driving portion is selected to participate in the data-writing stage, the data-writing module 11 may be connected to the first drain 103, and the compensation module 13 may be connected between the gate 101 and the second drain 104. Because $|Vd2-Vd1| \approx |Vs-Vd2| \times L2/(L1+L2)$, when $Vd2 \ge Vd1$, $(Vd2-Vg)-V0 \le Vd2-(Vg+V0) \le Vd2-Vd1 = |Vd2-Vd1| \le Vd2-(Vg-V0) = (Vd2-Vg)+V0$; or when $Vd2 \le Vd1$, $(Vg-Vd2)-V0 = (Vg-V0)-Vd2 \le Vd1-Vd2 = |Vd2-Vd1| \le (Vg+V0)-Vd2 = (Vg-Vd2)+V0$. Because $(Vd2-Vg) \le |Vg-Vd2|$ and $(Vg-Vd2) \le |Vg-Vd2|$, $|Vd2-Vd1| \le |Vg-Vd2|+V0$, in other words, $|Vs-Vd2| \times L2/(L1+L2) \le |Vg-Vd2|+V0$. Therefore, $L1/L2 \ge |Vs-Vd2|/[|Vg-Vd2|+V0]-1 = \Delta Vsd2/(\Delta Vgd2+V0)-1$.

According to the above calculation, the values of the lengths L1 and L2 may affect the voltage difference between the first drain 103 and the gate 101. When $L1/L2 \ge \Delta Vsd2/(\Delta Vgd2+V0)-1$ and $0 \le V0 \le \Delta Vsg \times 1/2$, it may be ensured that the voltage difference between the gate 101 and the first drain 103 may be less than half of the voltage difference between the gate 101 and the source 102, which may avoid the problems where the inputted data signal is inaccurate and the brightness is difficult to reach the expected brightness when the screen is refreshed due to too large voltage difference between the gate 101 and the source 102.

The light-emitting stage of the light-emitting element defined in the present disclosure may be limited in terms of the circuit working mechanism, which may not only include the light that is actually emitted from the light-emitting element and is capable of being recognized by the human eye, but also include the black screen with substantially small driving current and substantially low brightness.

In addition, in the present disclosure, in the pixel circuit 10, the node N1 may be connected to the gate 101 of the driving transistor, the node N2 may be connected to the source 102 of the driving transistor, the node N3 may be connected to the first drain 103 of the driving transistor, and the node N4 may be connected to the second drain 104 of the driving transistor. The first driving portion T01 and the second driving portion T02 may be two portions of the driving transistor T0, and may together form the driving transistor T0. In other words, the driving transistor T0 may still be an integral transistor. Each of the gate 101 and the active layer 105 of the driving transistor T0 may be disposed as one piece. The first drain 103 may be connected to the active layer 105, and may be a node drawn from the middle of the driving transistor T0, and may be configured to be connect to the compensation module 13. The connection method of the first drain 103 may be analyzed in detail later. In practical applications, each of the gate 101 and the active layer 105 of the driving transistor T0 may be divided into several pieces. The present disclosure may mainly focus on the case where the driving transistor T0 is an integral transistor.

Optionally, in one embodiment, referring to FIG. 1, the driving transistor T0 may be a PMOS transistor. The data-writing module 11 may be connected to the source 102, the compensation module 13 may be connected between the gate 101 and the first drain 103, and $L2/L1 \geq \Delta Vsd2/(\Delta Vsg+V0)-1$ and $0 \leq V0 \leq \Delta Vgd2 \times 1/2$. When the driving transistor T0 is a PMOS transistor, in the light-emitting stage, the driving transistor T0 may be turned on, and the voltage of the gate 101 may be less than the voltage of the source 102. In the pixel circuit illustrated in FIG. 1, in the light-emitting stage, the source voltage Vs of the driving transistor T0 may be a PVDD signal, the gate voltage Vg may be (Vdata-Vth), and the second drain voltage Vd2 may often be a substantially low voltage, e.g., Vs=4.6V, Vg=3V, and Vd2=−2V. In view of this, the voltage difference between the gate voltage Vg and the second drain voltage Vd2 ($\Delta Vgd2=|Vg-Vd2|$) may be substantially large, for example, ΔVgd2 may be 5V or even greater. The voltage difference between the gate voltage Vg and the source voltage Vs ($\Delta Vsg=|Vg-Vs|$) may be substantially small, for example, ΔVsg may be 1.5V or even smaller. The source voltage Vs may often be greater than the gate voltage Vg, and the gate voltage Vg may often be greater than the second drain voltage Vd2.

In view of this, the problem shown in FIG. 5 may occur. The arrows in FIG. 5 may illustrate densities of electric field lines between the source and the gate, between the first drain and the gate, and between the second drain and the gate, which may merely exemplarily illustrate the electric field strength through the density of the electric field lines. Because the difference between the source voltage Vs and the gate voltage Vg is substantially small, the electric field strength between the source and the gate may be substantially small. Because the difference between the second drain voltage Vd2 and the gate voltage Vg is substantially large, the electric field strength between the second drain and the gate may be substantially large. As described above, the strong electric field between the second drain and the gate may be the main reason that causes the deviation of the threshold voltage of the driving transistor T0.

Therefore, for such driving transistor, the first driving portion T01 may be selected to participate in the data-writing stage, while the second driving portion T02 may not participate in the data-writing stage, such that the deviation of the threshold voltage of the driving transistor T0 and the problem of inaccurate written data signal caused by the second driving portion T02 when the screen is refreshed may be fully avoided. In view of this, $L2/L1 \geq \Delta Vsd2/(\Delta Vsg+V0)-1$, and $0 \leq V0 \leq \Delta Vgd2 \times 1/2$. Because ΔVgd2 is substantially large, ΔVgd1 may be smaller than $\Delta Vgd2 \times 1/2$, such that the voltage difference between the gate 101 and the first drain 103 may be reduced to within half of the voltage difference between the gate 101 and the second drain 104, and the second driving portion T02 with a substantially large voltage difference may not participate in the data-writing stage.

Optionally, in one embodiment, referring to FIG. 4, the driving transistor T0 may be an NMOS transistor. The data-writing module 11 may be connected to the first drain 103, the compensation module 13 may be connected between the gate 101 and the second drain 104, and $L1/L2 \geq \Delta Vsd2/(\Delta Vgd2+V0)-1$, $0 \leq V0 \leq \Delta Vsg \times 1/2$. When the driving transistor T0 is an NMOS transistor, in the light-emitting stage, the driving transistor T0 may be turned on, and the voltage of the gate 101 may be greater than the voltage of the source 102. In the pixel circuit illustrated in FIG. 4, in the light-emitting stage, the second drain voltage Vd2 of the driving transistor T0 may be the PVDD signal, the gate voltage Vg may be (Vdata+Vth), and the source voltage Vs may be a substantially low voltage, e.g., Vd2=4.6V, Vg=4V, and Vs=1V. In view of this, the voltage difference between the gate voltage Vg and the second drain voltage Vd2 ($\Delta Vgd2=|Vg-Vd2|$) may be substantially small, for example, ΔVgd2 may be 0.6V or even smaller. The voltage difference between the gate voltage Vg and the source voltage Vs ($\Delta Vsg=|Vg-Vs|$) may be substantially large, for example, ΔVsg may be 3V or even greater.

In view of this, the problem shown in FIG. 6 may occur. The arrows in FIG. 6 may illustrate densities of electric field lines between the source and the gate, between the first drain and the gate, and between the second drain and the gate, which may merely exemplarily illustrate the intensity of the electric field through the density of the electric field lines. Because the difference between the source voltage Vs and the gate voltage Vg is substantially large, the electric field strength between the source and the gate may be substantially large. As described above, the strong electric field between the source and the gate may be the main reason that causes the deviation of the threshold voltage of the driving transistor T0.

Therefore, for such driving transistor, the second driving portion T02 may be selected to participate in the data-writing stage, while the first driving portion T01 may not participate in the data-writing stage, such that the deviation of the threshold voltage of the driving transistor T0 and the problem of inaccurate written data signal caused by the first driving portion T01 when the screen is refreshed may be fully avoided. In view of this, $L1/L2 \geq \Delta Vsd2/(\Delta Vgd2+V0)-1$, and $0 \leq V0 \leq \Delta Vsg \times 1/2$. Because ΔVsg is substantially large, ΔVgd1 may be smaller than $\Delta Vsg \times 1/2$, such that the voltage difference between the gate 101 and the first drain 103 may be reduced to within half of the voltage difference between the gate 101 and the source 102, and the first driving portion T01 with a substantially large voltage difference may not participate in the data-writing stage.

In addition, in certain embodiments, referring to FIG. 3, the driving transistor T0 may be a PMOS transistor. The data-writing module 11 may be connected to the first drain 103, the compensation module 13 may be connected between the gate 101 and the second drain 104, and $L1/L2 \geq \Delta Vsd2/(\Delta Vgd2+V0)-1$ and $0 \leq V0 \leq \Delta Vsg \times 1/2$. In view of this, in the light-emitting stage, the driving transistor T0 may contain some special designs, which may cause the difference between ΔVsg and ΔVgd2 to be substantially small, or ΔVsg to be greater than ΔVgd2. In view of this, the electric field between the source and the gate may be the main reason that causes the deviation of the threshold voltage of the driving transistor T0. Therefore, for such PMOS driving transistor, the second driving portion T02 may be selected to participate in the data-writing stage, while the first driving portion T01 may not participate in the data-writing stage.

In certain embodiments, referring to FIG. 2, the driving transistor T0 may be an NMOS transistor. The data-writing module 11 may be connected to the source 102, the compensation module 13 may be connected between the gate 101 and the first drain 103, and $L2/L1 \geq \Delta Vsd2/(\Delta Vsg+V0)-1$ and $0 \leq V0 \leq \Delta Vgd2 \times 1/2$. In view of this, in the light-emitting stage, the driving transistor T0 may contain some special designs, which may cause the difference between ΔVsg and ΔVgd2 to be substantially small, or ΔVgd2 to be greater than ΔVsg. In view of this, the electric field between the gate and the second drain may be the main reason that causes the deviation of the threshold voltage of the driving transistor T0. Therefore, for such NMOS driving transistor, the first driving portion T01 may be selected to participate in the data-writing stage, while the second driving portion T02 may not participate in the data-writing stage.

Optionally, in certain embodiments, the data-writing module 11 may be connected to the source 102, the compensation module 13 may be connected between the gate 101 and the first drain 103, and $L2/L1 \geq \Delta Vsd2/(\Delta Vsg+V0)-1$ and $0 \leq V0 \leq \Delta Vgd2 \times 1/2$, where $\Delta Vsd2 \geq \Delta Vsg+V0$. In such connection mode, as described above, because the voltage difference ΔVgd2 between the gate 101 and the second drain 104 is often substantially large, and the voltage difference ΔVsg between the gate 101 and the source 102 is substantially small, the second driving portion T02 may not be connected in the data-writing stage. Through setting $\Delta Vsd2 \geq \Delta Vsg+V0$, $L2/L1 \geq 0$ may be ensured. Under such premise, the ratio of L2/L1 may also have any other restriction, which may be described later.

In certain embodiments, the data-writing module 11 may be connected to the first drain 103, the compensation module 13 may be connected between the gate 101 and the second drain 104, and $L1/L2 \geq \Delta Vsd2/(\Delta Vgd2+V0)-1$ and $0 \leq V0 \leq \Delta Vsg \times 1/2$, where $\Delta Vsd2 \geq \Delta Vgd2+V0$. In such connection mode, as described above, because the voltage difference ΔVsg between the gate 101 and the source 102 is often substantially large, and the voltage difference ΔVgd2 between the gate 101 and the second drain 104 is substantially small, the first driving portion T01 may not be connected in the data-writing stage. Through setting $\Delta Vsd2 \geq \Delta Vgd2+V0$, $L1/L2 \geq 0$ may be ensured. Under such premise, the ratio of L1/L2 may also have any other restriction, which may be described later.

In one embodiment, optionally, the data-writing module 11 may be connected to the source 102, the compensation module 13 may be connected between the gate 101 and the first drain 103, and $L2/L1 \geq \Delta Vsd2/V0-1$ and $0 \leq V0 \leq \Delta Vgd2 \times 1/2$. In a display panel, different light-emitting element 20 may have different requirements for light-emitting current when emitting light. For the pixel circuits in a same display panel, the gate voltages Vg of the driving transistors T0 in the light-emitting stage may be different. Based on the limitations of the process, to fully simplify the process, the pixel circuits in a same panel may be expected to be fabricated uniformly, and the overall structures of the driving transistors of different pixel circuits may be basically the same. When the Vg requirements are different while the basic structure requirements of the driving transistors are basically the same, the formula $L2/L1 \geq \Delta Vsd2/(\Delta Vsg+V0)-1$ may be further unified improved.

For the PMOS transistor, in such connection mode, the source voltage Vs may often be a PVDD signal, which may be a high voltage signal. The gate voltage Vg may often be lower than the source voltage Vs. When Vg approaches Vs, the driving current may become smaller. When $Vg \approx Vs$, a black screen may occur, which may be reflected in the formulas as $\Delta Vsg \geq 0$, $\Delta Vsg+V0 \geq V0$, and $\Delta Vsd2/(\Delta Vsg+V0) \leq \Delta Vsd2/V0$. The limit of $Vg \approx Vs$ may be taken as the standard, and $L2/L1 \geq \Delta Vsd2/V0-1 \geq \Delta Vsd2/(\Delta Vsg+V0)-1$ may be defined. In view of this, any other case where $Vg \leq Vs$ may often meet the requirement of the range of L2/L1.

Similarly, for the NMOS transistor, to simplify the process, the driving transistors may be uniformly designed, and Vg may often be greater than Vs. When $Vg \approx Vs$, the black screen may occur. The limit of $Vg \approx Vs$ may be taken as the standard, and $L2/L1 \geq \Delta Vsd2/V0-1 \geq \Delta Vsd2/(\Delta Vsg+V0)-1$ may be defined. In view of this, any other case where $Vg \leq Vs$ may often meet the requirement of the range of L2/L1.

It should be noted that $0 \leq V0 \leq \Delta Vgd2 \times 1/2$ may be defined. Because both Vg and Vd2 may be two variables in actual situations, and ΔVgd2 may also be a variable. In specific implementation, to uniformly design the pixel circuits in the same display panel, V0 may be set to a certain value with a substantially small value, such that most or all situations may fall within the above range as much as possible, to facilitate the unified design of the panel. The value of V0 may be further described later.

Optionally, in one embodiment, the data-writing module 11 may be connected to the first drain 103, the compensation module 13 may be connected between the gate 101 and the second drain 104, and $L1/L2 \geq \Delta Vsd2/V0-1$ and $0 \leq V0 \leq \Delta Vsg \times 1/2$. Similarly, to simplify the process, when selecting L1/L2, considering the unified design of the driving transistors in the same display panel, the limit of $\Delta Vgd2=0$ may be taken to obtain $L1/L2 \geq \Delta Vsd2/V0-1 \geq \Delta Vsd2/(\Delta Vgd2+V0)-1$, such that a unified design of the driving transistors in the panel may be achieved. In view of this, V0 may be set to a certain value with a substantially small value, such that most or all situations may fall within the above range as much as possible, to facilitate the unified design of the panel. The value of V0 may be further described later.

Optionally, in one embodiment, the data-writing module 11 may be connected to the source 102, the compensation module 13 may be connected between the gate 101 and the first drain 103, and $L2/L1 \geq 0.5$. As described above, in such connection mode, $L2/L1 \geq \Delta Vsd2/(\Delta Vsg+V0)-1$ and $0 \leq V0 \leq \Delta Vgd2 \times 1/2$. Such connection method may often be selected when $\Delta Vgd2 \geq \Delta Vsg$. Because for the PMOS transistor, $Vd2 \leq Vg \leq Vs$, or for the NMOS transistor, $Vs \leq Vg \leq Vd2$, then $\Delta Vsd2=\Delta Vsg+\Delta Vgd2$. When $\Delta Vsg \leq \Delta Vgd2 \leq 2 \times \Delta Vsg$, $\Delta Vsg \geq 1/3 \times \Delta Vsd2$. For example, Vs=4.6V, Vd2=−2V, $\Delta Vsg \geq 1/3 \times 6.6V=2.2V$, and $\Delta Vgd2 \leq 2/3 \times 6.6V=4.4V$. In view of this, the voltage difference between ΔVsg and Vsd2 may be approximately 2V.

When the voltage difference between ΔVsg and Vsd2 is within such range, the electric field strength between the gate 101 and the second drain 104 may be substantially small to a certain extent, which may not cause too much deviation of the threshold voltage of the driving transistor. When $\Delta Vgd2 \geq 2 \times \Delta Vsg$, in other words, when $\Delta Vgd2 \geq 2/3 \times \Delta Vsd2$, the voltage difference between ΔVgd2 and ΔVsg may be substantially large, which may cause a substantially obvious deviation of the threshold voltage. To avoid such phenomenon, in one embodiment, a partial region where $\Delta Vgd2 \geq 2 \times \Delta Vsg$ may not participate in the data-writing stage. In view of this, $\Delta Vsg \leq 1/3 \times \Delta Vsd2$, and $\Delta Vgd2 \geq 2/3 \times \Delta Vsd2$. Further, $V0 \leq 2/3 \times \Delta Vsd2 \times 1/2 \leq \Delta Vgd2 \times 1/2$ may be defined, then, $\Delta Vsg+V0 \leq 1/3 \times \Delta Vsd2+2/3 \times \Delta Vsd2 \times 1/2=2/3 \times \Delta Vsd2$, therefore, $L2/L1 \geq \Delta Vsd2/(\Delta Vsg+V0)-1 \geq Vsd2/(2/3 \times \Delta Vsd2)-1=0.5$ may be obtained.

In view of this, when the voltage difference between the gate and the second drain is substantially large, the portion with a significantly large voltage difference may not participate in the data-writing stage, thereby facilitating to reduce the deviation of the threshold voltage of the driving transistor.

Alternatively, in one embodiment, the data-writing module 11 may be connected to the first drain 103, the compensation module 13 may be connected between the gate 101 and the second drain 104, and $L1/L2 \geq 0.5$. Similarly, in such connection mode, $L1/L2 \geq \Delta Vsd2/(\Delta Vgd2+V0)-1$, and $0 \leq V0 \leq \Delta Vsg \times 1/2$. Such connection mode may often be selected when $\Delta Vsg \geq \Delta Vgd2$. Because for the PMOS transistor, $Vd2 \leq Vg \leq Vs$, or for the NMOS transistor, $Vs \leq Vg \leq Vd2$, then $\Delta Vsd2 = \Delta Vsg + \Delta Vgd2$. When $\Delta Vgd2 \leq \Delta Vsg \leq 2 \times \Delta Vgd2$, $\Delta Vgd2 \geq 1/3 \times \Delta Vsd2$, for example, $Vs=-2V$, $Vd2=4.6V$, $\Delta Vgd2 \geq 1/3 \times 6.6V = 2.2V$, and $\Delta Vsg \leq 2/3 \times 6.6V = 4.4V$. In view of this, the voltage difference between ΔVsg and Vsd2 may be approximately 2V.

When the voltage difference between ΔVsg and Vsd2 is within such range, the electric field strength between the gate 101 and the source 102 may be substantially small to a certain extent, which may not cause too much deviation of the threshold voltage. When $\Delta Vsg \geq 2 \times \Delta Vgd2$, in other words, when $\Delta Vsg \geq 2/3 \times \Delta Vsd2$, the voltage difference between ΔVsg and ΔVgd2 may be substantially large, which may cause a substantially obvious deviation of the threshold voltage. To avoid such phenomenon, in one embodiment, a partial region where $\Delta Vsg \geq 2 \times \Delta Vgd2$ may not participate in the data-writing stage. In view of this, $\Delta Vgd2 \leq 1/3 \times \Delta Vsd2$, and $\Delta Vsg \geq 2/3 \times \Delta Vsd2$. Further, $V0 \leq 2/3 \times \Delta Vsd2 \times 1/2 \leq \Delta Vsg \times 1/2$ may be defined, then $\Delta Vgd2+V0 \leq 1/3 \times \Delta Vsd2 + 2/3 \times \Delta Vsd2 \times 1/2 = 2/3 \times \Delta Vsd2$, therefore, $L1/L2 \geq \Delta Vsd2/(\Delta Vgd2+V0)-1 \geq Vsd2/(2/3 \times \Delta Vsd2)-1=0.5$ may be obtained.

In view of this, when the voltage difference between the gate and the source is substantially large, the portion with a significantly large voltage difference may not participate in the data-writing stage, thereby facilitating to reduce the deviation of the threshold voltage of the driving transistor.

In addition, optionally, as described above, to uniformly fabricate the driving transistors of the display panel and to simplify the process, the data-writing module 11 may be connected to the source 102, the compensation module 13 may be connected between the gate 101 and the first drain 103, and $L2/L1 \geq \Delta Vsd2/V0-1$ and $0 \leq V0 \leq \Delta Vgd2 \times 1/2$. In the case of $V0 \leq 2/3 \times \Delta Vsd2 \times 1/2 = 1/3 \times \Delta Vsd2$, $\Delta Vsd2/V0 \geq \Delta Vsd2/(1/3 \times \Delta Vsd2)=3$ and $L2/L1 \geq \Delta Vsd2/V0-1 \geq 2$. In view of this, while making the portion of the driving transistor with a significantly large voltage difference not participate in the data-writing stage, the unified design of the panel may be facilitated, which may effectively simplify the process.

Optionally, as described above, to uniformly fabricate the driving transistors of the display panel and to simplify the process, the data-writing module 11 may be connected to the first drain 103, the compensation module 13 may be connected between the gate 101 and the second drain 104, and $L1/L2 \geq \Delta Vsd2/V0-1$, and $0 \leq V0 \leq \Delta Vsg \times 1/2$. In the case of $V0 \leq 2/3 \times \Delta Vsd2 \times 1/2 = 1/3 \times \Delta Vsd2$, $\Delta Vsd2/V0 \geq \Delta Vsd2/(1/3 \times \Delta Vsd2)=3$ and $L1/L2 \geq \Delta Vsd2/V0-1 \geq 2$. In view of this, while making the portion of the driving transistor with a significantly large voltage difference not participate in the data-writing stage, the unified design of the panel may be facilitated, which may effectively simplify the process.

In addition, optionally, in one embodiment, to ensure the voltage difference ΔVgd1 between the gate voltage Vg and the first drain voltage Vd1 to be further reduced, the range of V0 may be further reduced, where $V0 \leq \Delta Vgd2 \times 1/3$, or $V0 \leq \Delta Vsg \times 1/3$, which may facilitate to fully reduce the voltage difference ΔVgd1 between the gate voltage Vg and the first drain voltage Vd1, to ensure the accuracy of the written data signal when the screen is refreshed.

Further, for the pixel circuits illustrated in FIGS. 1-4, the voltage difference ΔVgd1 between the gate 101 and the first drain 103 may often be set within 2V. The voltage difference ΔVgd1 may be substantially small, and the electric field strength may be substantially small, which may not cause a significant interference to the data signal when the screen is refreshed. Therefore, in one embodiment, through setting $0 \leq V0 \leq 2V$, it may be ensured that ΔVgd1 may be within a substantially small voltage range, thereby improving the accuracy of written data signal when the screen is refreshed to ensure the display effect. Under such premise, V0 may be further reduced to a range of $0 \leq V0 \leq 1.5V$, $0 \leq V0 \leq 1V$, and $0 \leq V0 \leq 0.5V$, etc. Specifically, V0 may be one of 2V, 1.8V, 1.5V, 1.2V, 1.0V, 0.8V, 0.6V, 0.4V, 0.2V, and 0V. In practical applications, a reasonable V0 value may be selected according to the specific situation.

Figure 8:
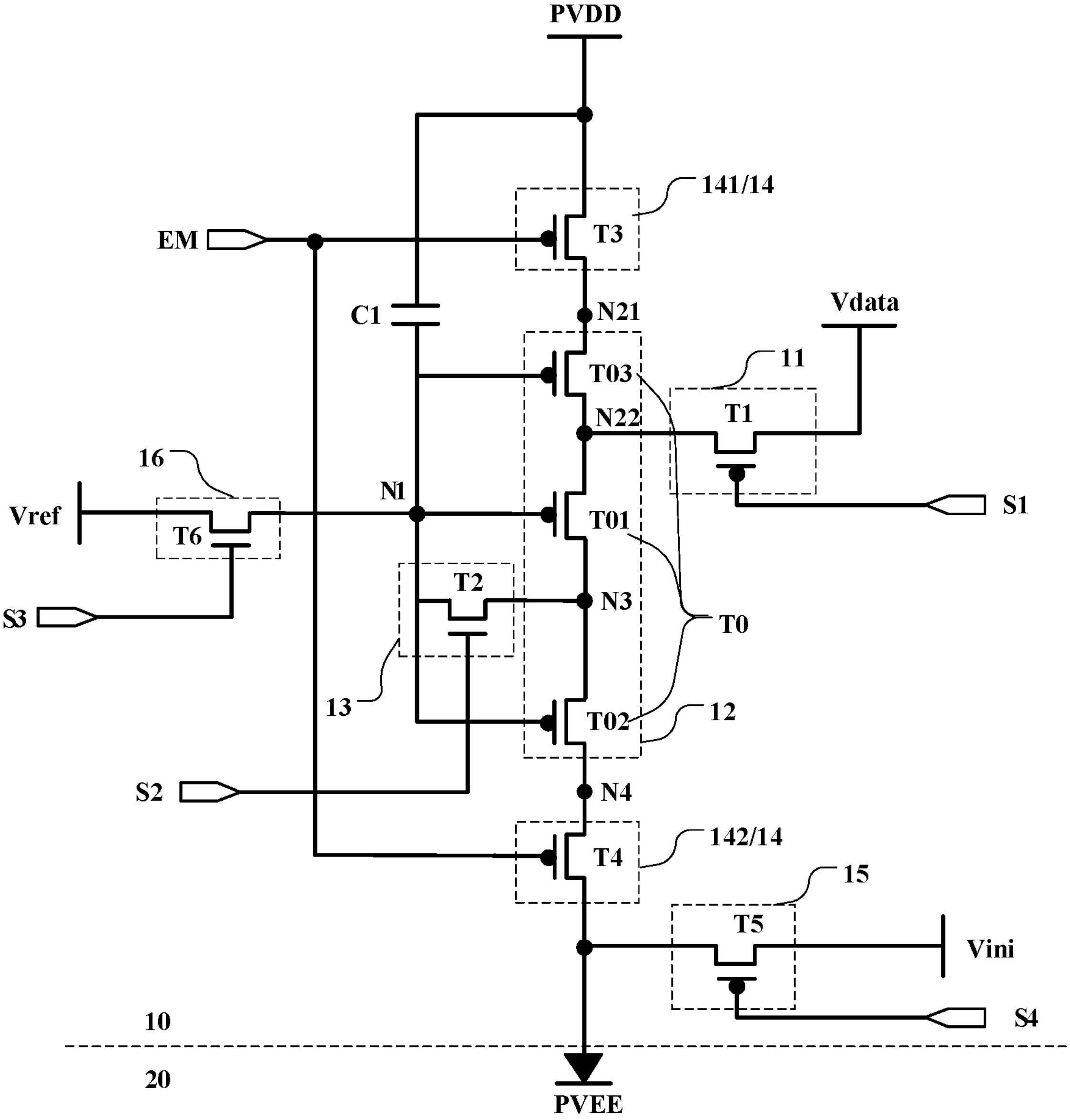
FIG. 8 illustrates a schematic diagram of a pixel circuit of another exemplary display panel consistent with disclosed embodiments of the present disclosure.
Figure 9:
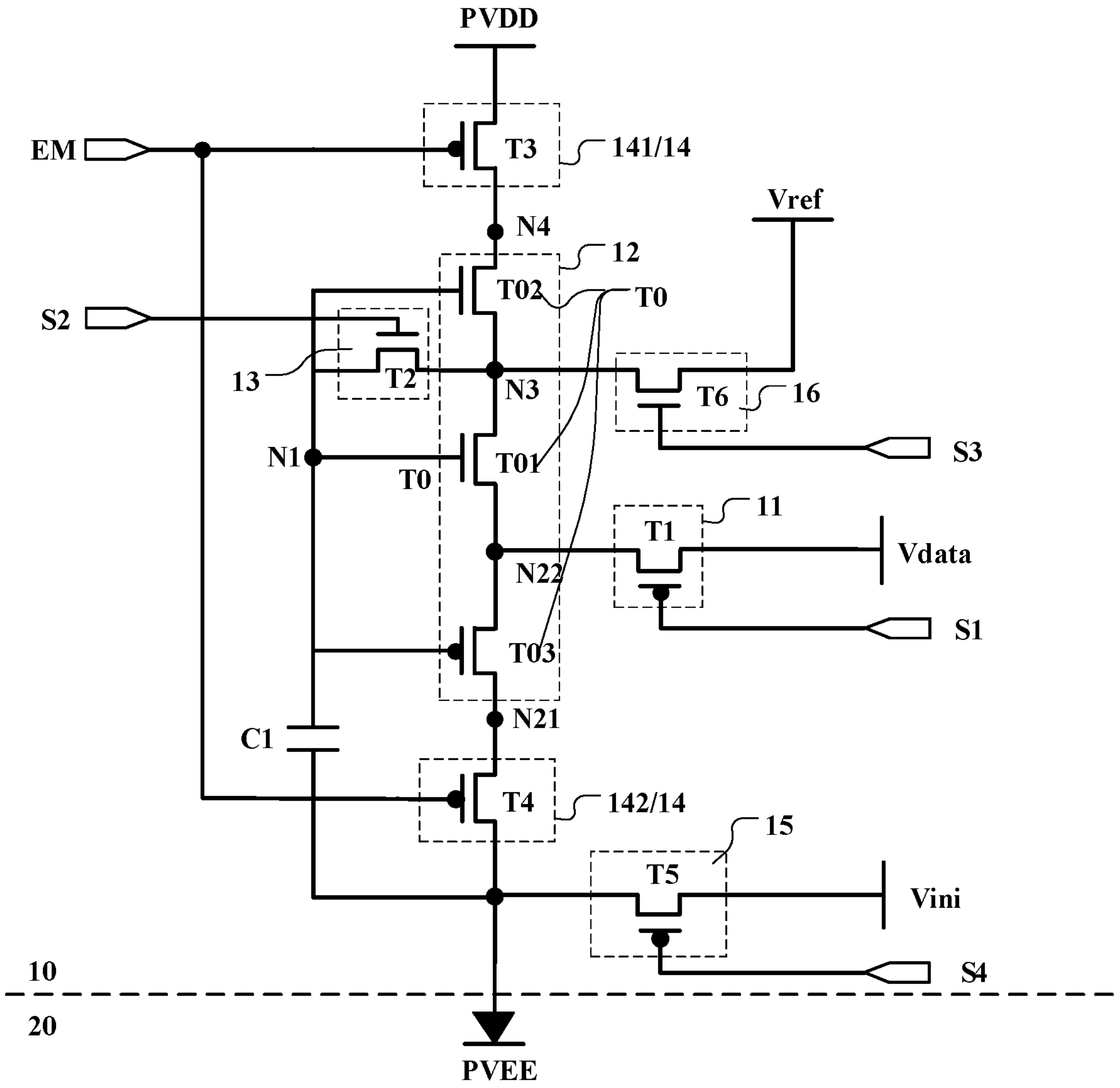
FIG. 9 illustrates a schematic diagram of a pixel circuit of another exemplary display panel consistent with disclosed embodiments of the present disclosure.
Figure 10:
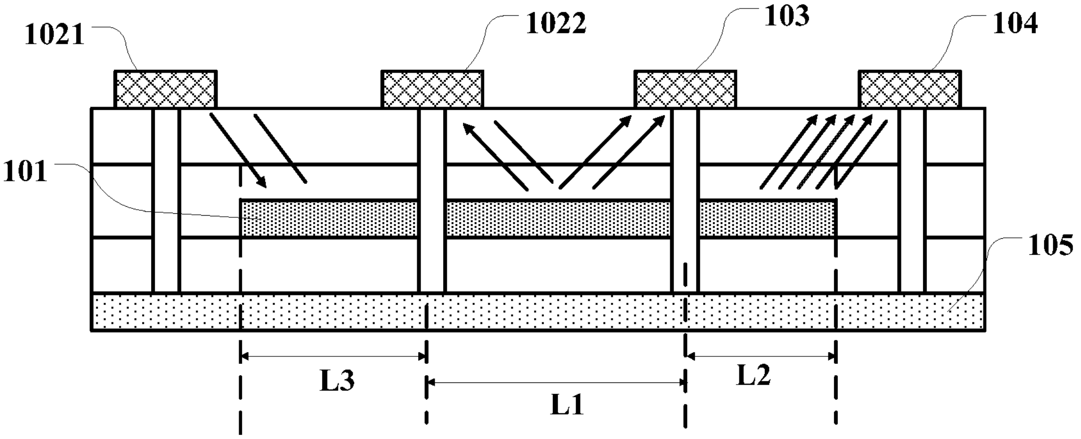
FIG. 10 illustrates a schematic cross-sectional view of another driving transistor consistent with disclosed embodiments of the present disclosure.

FIG. 8 illustrates a schematic diagram of a pixel circuit of another display panel consistent with disclosed embodiments of the present disclosure; FIG. 9 illustrates a schematic diagram of a pixel circuit of another display panel consistent with disclosed embodiments of the present disclosure; and FIG. 10 illustrates a schematic cross-sectional view of another driving transistor consistent with disclosed embodiments of the present disclosure. Referring to FIGS. 8-10, the source 102 of the driving transistor T0 may include a first source 1021 and a second source 1022. A third driving portion T03 may be disposed between the first source 1021 and the second source 1022, and a length of a channel region of the third driving portion T03 may be L3. The data-writing module 11 may be connected to the second source 1022, and the compensation module 13 may be connected between the gate 101 and the first drain 103.

The foregoing embodiments may illustrate the processing methods when one of ΔVsg and ΔVgd2 is greater than the other one and the voltage difference is large to a certain extent. On such basis, the present embodiment may further consider that the driving transistor may meet one or more of following conditions: $\Delta Vs2g = |Vs2-Vg| \leq V0$, where ΔVs2g may be the voltage difference between the second source 1022 and the gate 101, and $\Delta Vgd1 = |Vg-Vd1| \leq V0$, where ΔVgd1 may be the voltage difference between the first drain 103 and the gate 101. Then, the first driving portion T01 may participate in the data-writing stage, and the second driving portion T02 and the third driving portion T03 with a substantially large voltage difference may not participate in the data-writing stage. Therefore, the first driving portion T01 may have a substantially small voltage difference, which may improve the accuracy of the written data signal as much as possible, and may avoid the problem of brightness flickering when refreshing the screen.

In view of this, if $\Delta Vs2g \leq V0$ is required, $L3/(L1+L2) \geq \Delta Vs1d2/(\Delta Vgd2+V0)-1$, and $0 \leq V0 \leq \Delta Vs1g \times 1/2$, where $\Delta Vs1d2 = |Vs1-Vd2|$. In view of this, L1+L2 may be regarded as one piece, and then according to the above analysis process, such formula may be obtained. If $\Delta Vgd1 \leq V0$ is required, $L2/(L1+L3) \geq \Delta Vs1d2/(\Delta Vs1g+V0)-1$, and $0 \leq V0 \leq \Delta Vgd2 \times 1/2$, where $\Delta Vs1d2 = |Vs1-Vd2|$, and $\Delta Vs1g = |Vs1-Vg|$. In view of this, L3+L1 may be regarded as one piece, and then according to the above analysis process, such formula may be obtained. It should be noted that FIG. 10 may merely exemplarily illustrate the intensity of the electric field and the density of the electric field lines, and the directions of the arrows may be adjusted according to specific implementation.

Optionally, on the basis of the foregoing description, when $\Delta Vs2g \leq V1$ and $\Delta Vgd1 \leq V1$, the above two conditions may need to be met at the same time, and then $L3/(L1+L2) \geq \Delta Vs1d2/(\Delta Vgd2+V1)-1$ and $L2/(L1+L3) \geq \Delta Vs1d2/(\Delta Vs1g+V1)-1$ may be obtained, where V1 may be set to a certain value, which may facilitate the unified limitation of $\Delta Vs2g$ and $\Delta Vgd1$. According to the above description, when $0 \leq V1 \leq 2V$, a substantially large voltage difference may be prevented from being generated between the gate 101 and the second source 1022, and between the gate 101 and the first drain 103, which may make the threshold voltage of the first driving portion T01 substantially stable, to fully avoid the flickering problem when refreshing the screen. Under such premise, V1 may be further reduced to a range of $0 \leq V1 \leq 1.5V$, $0 \leq V1 \leq 1V$, and $0 \leq V1 \leq 0.5V$, etc. Specifically, V1 may be one of 2V, 1.8V, 1.5V, 1.2V, 1.0V, 0.8V, 0.6V, 0.4V, 0.2V, and 0V. In practical applications, a reasonable V1 value may be selected according to the specific situation.

The relationship between the lengths of the channel regions of the first driving portion T01, the second driving portion T02, and the third driving portion T03 and the related voltage differences may be described above. The structure of the driving transistor T0 may be described in the following.

Figure 11:
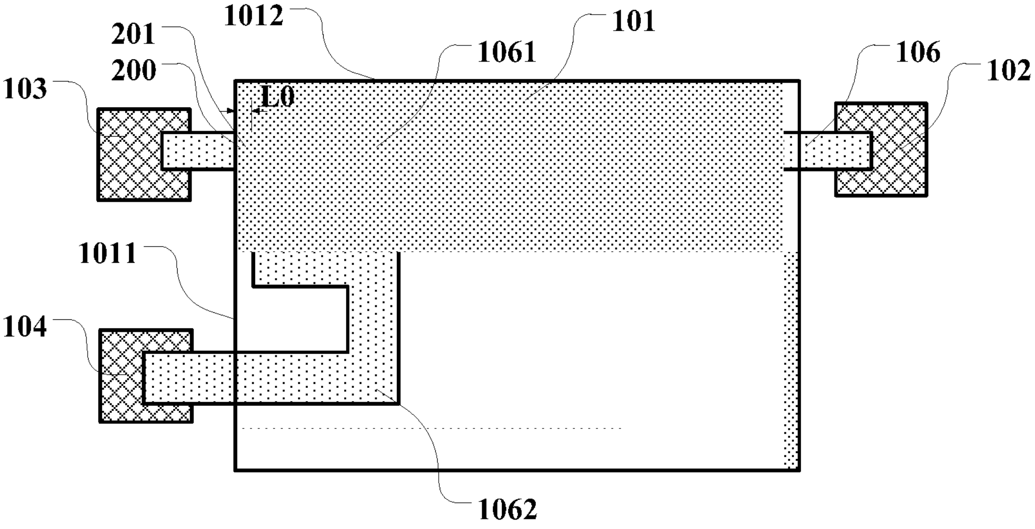
FIG. 11 illustrates a schematic top view of a driving transistor consistent with disclosed embodiments of the present disclosure.

FIG. 11 illustrates a schematic top view of a driving transistor consistent with disclosed embodiments of the present disclosure. Referring to FIG. 11, a channel region 106 of the active layer 105 of the driving transistor T0 may include a first segment 1061, a second segment 1062, and a first site 200 disposed between the first segment 1061 and the second segment 1062. The first drain 103 may be connected to the first site 200, the first segment 1061 may be located in the first driving portion T01, and the second segment 1062 may be located in the second driving portion T02. The gate 101 may include a first side surface 1011, and the first side surface 1011 may be a side surface of the gate 101 closest to the first site 200. At least a partial region of the first segment 1061 may have a distance away from the first side surface 1011 of the gate 101 greater than the distance between the first site 200 and the first side surface 1011. Alternatively, At least a partial region of the second segment 1062 may have a distance away from the first side surface 1011 of the gate 101 greater than the distance between the first site 200 and the first side surface 1011.

In the present disclosure, the setting of the first drain 103 may need to consider $\Delta Vgd1$, and $\Delta Vgd1$ may be related to the ratio of L1 over L2. In other words, the change of L1 or L2 may cause the change of $\Delta Vgd1$. As described above, both L1 and L2 may be designed according to certain requirements. Therefore, to avoid unnecessary voltage change when the first site 200 is connected to the first drain 103, the length of the channel region between the first site 200 and the first drain 103 may need to be sufficiently small, and the channel region may even not need to be disposed between the first site 200 and the first drain 103.

In view of this, the first site 200 may need to be extended beyond at least one side of the gate 101, or may at least be extended very close to a side surface of the gate 101, and such side surface may be defined as the first side surface 1011. In view of this, the distance between the first site 200 and the first side surface 1011 may be zero, or may be sufficiently small to be facilitated to be connected to the first drain 103. The first site 200 may be located between the first segment 1061 and the second segment 1062. The first segment 1061 and the second segment 1062 may need to have lengths L1 and L2, respectively, and the channel region 106 may overlap the gate. Therefore, to ensure the lengths of L1 and L2, at least one of the first segment 1061 and the second segment 1062 may need to be wound away from the first side surface 1011. After the lengths L1 and L2, at least one of the first segment 1061 and the second segment 1062 may be wound out of the coverage of the gate 101. Especially, to consider the process factors, when the gate 101 is made into a rectangle, such design may be very necessary. FIG. 11 illustrates a case where at least a portion of the second segment 1062 may have a distance away from the first side surface 1011 greater than the distance between the first site 200 and the first side surface 1011. In certain embodiments, at least a portion of the first segment 1061 may have a distance away from the first side surface 1011 greater than the distance between the first site 200 and the first side surface 1011.

In addition, optionally, in one embodiment, the gate 101 may further include a second side surface 1012. The second side surface 1012 may be connected with the first side surface 1011, and the first side surface 1011 and the second side surface 1012 may be two side surfaces of the gate 101 closet to the first site 200. At least a partial region of the first segment 1061 may have a distance away from the first side surface 1011 of the gate 101 greater than the distance between the first site 200 and the first side surface 1011, and/or at least a partial region of the second segment 1062 may have a distance away from the second side surface 1012 of the gate 101 greater than the distance between the first site 200 and the second side surface 1012.

Referring to FIG. 11, the first side surface 1011 and the second side surface 1012 may be two side surfaces of the gate 101 closet to the first site 200. As described above, to ensure the accuracy of the voltage of the first drain 103, the first site 200 may need to be sufficiently close to the side surface of the gate 101 to facilitate the extraction of the first drain 103. However, on the other hand, the lengths of the first segment 1061 and the second segment 1062 may need to be ensured. Therefore, at least one of the first segment 1061 the second segment 1062 may need to be detoured, or both of the first segment 1061 the second segment 1062 may need to be detoured. Therefore, the distance between at least a partial region of the first segment 1061 and the first side surface 1011 of the gate 101 may be greater than the distance between the first site 200 and the first side surface 1011, and/or the distance between at least a partial region of the second segment 1062 and the second side surface 1012 of the gate 101 may be greater than the distance between the first site 200 and the second side surface 1012.

Figure 12:
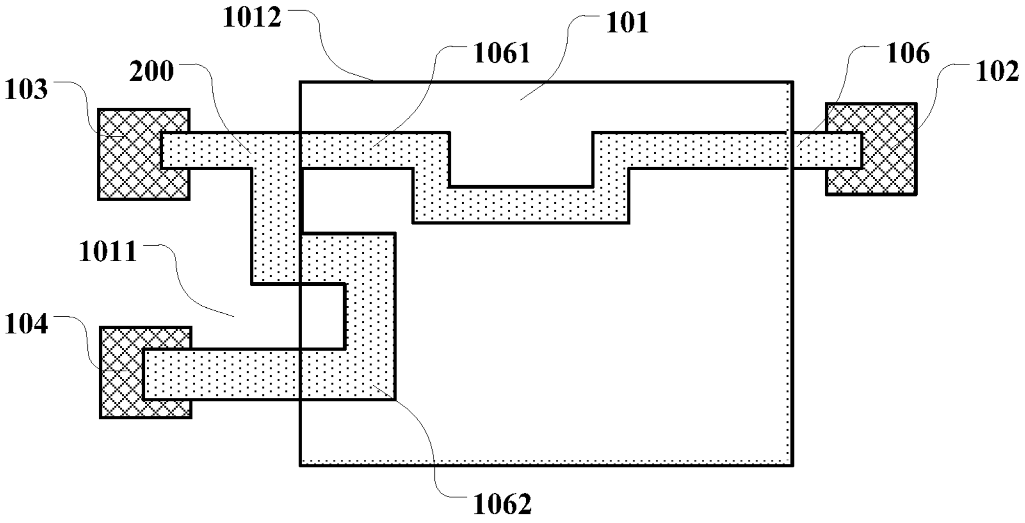
FIG. 12 illustrates a schematic top view of another driving transistor consistent with disclosed embodiments of the present disclosure.

FIG. 12 illustrates a schematic top view of another driving transistor consistent with disclosed embodiments of the present disclosure. In addition, optionally, referring to FIG. 12, the first site 200 may not overlap the gate 101. In view of this, the first site 200 may not constitute a portion of the channel region, and may be connected to the first drain 103 after being extended, which may have little influence on the voltage of the first drain 103, and may facilitate to the division of the first driving portion T01 and the second driving portion T02 according to the voltage.

Optionally, referring to FIG. 11, the first site 200 may at least partially overlap the gate 101. An auxiliary channel region 201 may be disposed between the first site 200 and the first drain 103. The auxiliary channel region 201 may have a length of L0, where $0 \leq L0 \leq V0 \times (L1+L2)/(10 \times Vsd2)$. In one embodiment, as described above, the voltage value of the first drain 103 may be obtained through comprehensive calculation. Therefore, the voltage loss may need to be as small as possible when the first site 200 is connected to the first drain 103. If the first site 200 is disposed outside of the gate 101, in other words, if the first site 200 does not overlap the gate 101, the overall area of the active layer 105 and the gate 101 on the panel may increase, which may not facilitate to improve the PPI of the panel.

Therefore, in some cases, the first site 200 may be set to at least partially overlap the gate, to save the total area occupied by the active layer 105 and the gate 101. In view of this, to avoid voltage loss through the auxiliary channel region 201 when the first site 200 is connected to the first drain 103, the length of the auxiliary channel region 201 may need to be reduced as much as possible. According to the above calculation, in the light-emitting stage, the voltage of the first site 200 may be Vd1. When the voltage of the first site 200 is transmitted to the first drain 103, assuming that the generated error is ΔV1, the voltage of the first drain 103 may be Vd1'=Vd1±ΔV1. In the present disclosure, ΔVgd1≤V0. To ensure the voltage of the first drain 103, ΔVgd1'≤V0, in other words, |Vg−Vd1±ΔV1|≤V0 and ΔVgd1±ΔV1≤V0. When ΔV1/V0≤1/10, in other words, when ΔV1 is at least within the range of one-tenth of V0, the auxiliary channel region 201 may have less influence on the voltage of the first drain 103. On such basis, ΔV1/V0≤1/10, ΔV1/V0≤1/15, ΔV1/V0≤1/20, ΔV1/V0≤1/30, etc., may be further defined, to fully ensure the accuracy of the voltage of the first drain 103, and to ensure that the voltage between the gate 101 and the first drain 103 may be less than V0.

In view of this, because L0/L1≈ΔV1/ΔVsd1 and ΔV1/ΔVsd1≤V0×1/10/ΔVsd1, then L0/L1≤V0×1/10/ΔVsd1. Because ΔVsd1≈ΔVsd2×L1/(L1+L2), then L0/L1≤V0×1/10×(L1+L2)/L1/ΔVsd2, therefore 0≤L0≤V0×(L1+L2)/(10×Vsd2).

When L0 satisfies such condition, the auxiliary channel region 201 may be prevented from affecting the voltage of the first drain 103 and ΔVgd1 as much as possible. On such basis, 0≤L0≤V0×(L1+L2)/(15×Vsd2), 0≤L0≤V0×(L1+L2)/(20×Vsd2) and 0≤L0≤V0×(L1+L2)/(30×Vsd2), etc., which may be determined according to specific situations.

In addition, as described above, V0≤2/3×ΔVsd2×1/2=1/3×ΔVsd2, and 0≤L0≤V0×(L1+L2)/(10×Vsd2), therefore 0≤L0≤(L1+L2)/30, which may ensure the accuracy of the voltage of the first drain 103 and ΔVgd1.

In addition, in one embodiment, optionally, referring to FIGS. 11-12, the data-writing module 11 may be connected to the source 102, and the compensation module 13 may be connected between the gate 101 and the first drain 103. The channel region of the first driving portion T01 may have a width smaller than the channel region of the second driving portion T02.

In another embodiment, the data-writing module 11 may be connected to the first drain 103, and the compensation module 13 may be connected between the gate 101 and the second drain 104. The channel region of the first driving portion T01 may have a width greater than the channel region of the second driving portion T02.

The width of a portion of the channel region participating in the data-writing stage may be smaller than the width of a portion of the channel region not participating in the data-writing stage. When the length of the channel region and the electric field strength are fixed, the larger the width of the channel region, the larger the area, and the smaller the electric field strength per unit area, i.e., the smaller the electric field density. The deviation of the threshold voltage of the driving transistor may be related to the electric field strength per unit area to certain extent. When the electric field strength between the gate and the second drain or between the gate and the source is substantially large, the deviation of the threshold voltage may be substantially serious. Therefore, in one embodiment, the channel region of the driving portion that does not participate in the data-writing stage may be appropriately widened, which may facilitate to reduce the deviation of the threshold voltage. Therefore, when the first driving portion T01 participates in the data-writing stage and the second driving portion T02 does not participate in the data-writing stage, the width of the channel region of the second driving portion T02 may be appropriately widened. When the first driving portion T01 does not participate in the data-writing stage and the second driving portion T02 participates in the data-writing stage, the width of the channel region of the first driving portion T01 may be appropriately widened.

Referring to FIGS. 1-12, in one embodiment, one end of the data-writing module 11 may be connected to the data signal terminal for receiving the data signal Vdata, the other end of the data-writing module 11 may be connected to the driving module 12, and the control terminal of the data-writing module 11 may be connected to the first scanning signal line S1 for receiving the first scanning signal. One end of the compensation module 13 may be connected to the gate 101 of the driving transistor T0, the other end of the compensation module 13 may be connected to the first drain 103 or the second drain 104 of the driving transistor T0, and the control terminal of the compensation module 13 may be connected to the second scanning signal line S2 for receiving the second scanning signal. Optionally, the data-writing module 11 may include a first transistor T1. A source of the first transistor T1 may be connected to the data signal terminal, a drain of the first transistor T1 may be connected to the driving transistor T0, and a gate of the first transistor T1 may be connected to the first scanning signal line S1.

In addition, in one embodiment, the pixel circuit may further include a light-emitting control module 14. The light-emitting control module 14 may selectively allow the light-emitting element 20 to enter the light-emitting stage. The light-emitting control module 14 may include a first light-emitting control module 141 and a second light-emitting control module 142. One end of the first light-emitting control module 141 may be connected to the first power signal terminal for receiving the first power signal PVDD, the other end of the first light-emitting control module 141 may be connected to the driving module 12, and the control terminal of the first light-emitting control module 141 may be connected to the light-emitting control signal line for receiving a light-emitting control signal EM. One end of the second light-emitting control module 142 may be connected to the driving module 12, the other end of the second light-emitting control module 142 may be connected to the light-emitting element 20, and the control terminal of the second light-emitting control module 142 may be connected to the light-emitting control signal line for receiving a light-emitting control signal EM.

The light-emitting control signal may be collectively referred to as EM. In one embodiment, the light-emitting control signal EM received by the first light-emitting module 141 may be the same as the light-emitting control signal EM received by the second light-emitting module 142. In certain embodiments, the first light-emitting control signal EM received by the first light-emitting module 141 may be different from the light-emitting control signal EM received by the second light-emitting module 142. The first light-emitting control module 141 may include a third transistor T3. A source of the third transistor T3 may be connected to the first power signal terminal, a drain of the third transistor T3 may be connected to the driving transistor T0, and a gate of the third transistor T3 may be connected to the light-emitting control signal line. The second light-emitting module 142 may include a fourth transistors T4. A source of the fourth transistor T4 may be connected to the driving transistor T0, a drain of the fourth transistor T4 may be connected to the light-emitting element 20, and a gate of the fourth transistor T4 may be connected to the light-emitting control signal line.

In the data-writing stage, the first scanning signal S1 may control the data-writing module 11 to be turned on, and the data signal Vdata may be written into the source 102 (node N2) of the driving transistor T0 through the data-writing module 11. The driving transistor T0 may be turned on, and the data signal Vdata may be written into the first drain 103 (node N3) through the first driving portion T01. The second scanning signal S2 may control the compensation module 13 to be turned on, and the data signal Vdata may be written into the gate 101 (node N1) of the driving transistor T0 through the compensation module 13. In the light-emitting stage of the light-emitting element 20, the light-emitting control signal EM may control the light-emitting module 14 to be turned on, the driving transistor T0 may be turned on, and the driving transistor T0 may generate a driving current to control the light-emitting element 20 to emit light.

In addition, referring to FIGS. 1-12, in one embodiment, the pixel circuit 10 may further include an initialization module 15 and a reset module 16. One end of the initialization module 15 may be connected to an initialization signal terminal for receiving an initialization signal Vini, the other end of the initialization module 15 may be connected to the light-emitting element 20, and a control terminal of the initialization module 15 may be connected to a fourth scanning line S4 for receiving a fourth scanning signal. The initialization module 15 may be configured to provide the initialization signal Vini to the light-emitting element 20 in an initialization stage, to initialize the voltage of the light-emitting element 20. The initialization module 15 may include a fifth transistor T5. A source of the fifth transistor T5 may be connected to the initialization signal terminal, a drain of the fifth transistor T5 may be connected to the light-emitting element 20, and a gate of the fifth transistor T5 may be connected to the fourth scanning signal line S4.

In one embodiment, the connection mode of the reset module 16 may be shown in FIG. 1. One end of the reset module 16 may be connected to a reset signal terminal for receiving a reset signal Vref, the other end of the reset module 16 may be connected to the gate 101 (node N1) of the driving transistor T0, and a control terminal of the reset module 16 may be connected to the third scanning signal line S3 for receiving the third scanning signal. In the reset stage, the third scanning signal line S3 may control the reset module 16 to be turned on. The reset module 16 may provide a reset signal for the gate 101 of the driving transistor T0. The reset module 16 may include a sixth transistor T6. A source of the sixth transistor T6 may be connected to the reset signal terminal, a drain of the sixth transistor T6 may be connected to the gate of the driving transistor T0, and a gate of the sixth transistor T6 may be connected to the second scanning signal line S2.

In another embodiment, the connection mode of the reset module 16 may be shown in FIG. 2. One end of the reset module 16 may be connected to the reset signal terminal for receiving the reset signal Vref, the other end of the reset module 16 may be connected to the first drain 103 (node N3), and the control terminal of the reset module 16 may be connected to a third scanning signal line S3 for receiving the third scanning signal. In the reset stage, the third scanning signal line S3 may control the reset module 16 to be turned on, the second scanning signal line S2 may control the compensation module 13 to be turned on, and the reset signal Vref may be written into the gate of the driving transistor T0 to reset the driving transistor T0. In view of this, the source of the sixth transistor T6 may be connected to the reset signal terminal, the drain of the sixth transistor T6 may be connected to the first drain 103 (node N3) of the driving transistor, and the gate of the sixth transistor T6 may be connected to the third scanning signal line S3.

Figure 13:
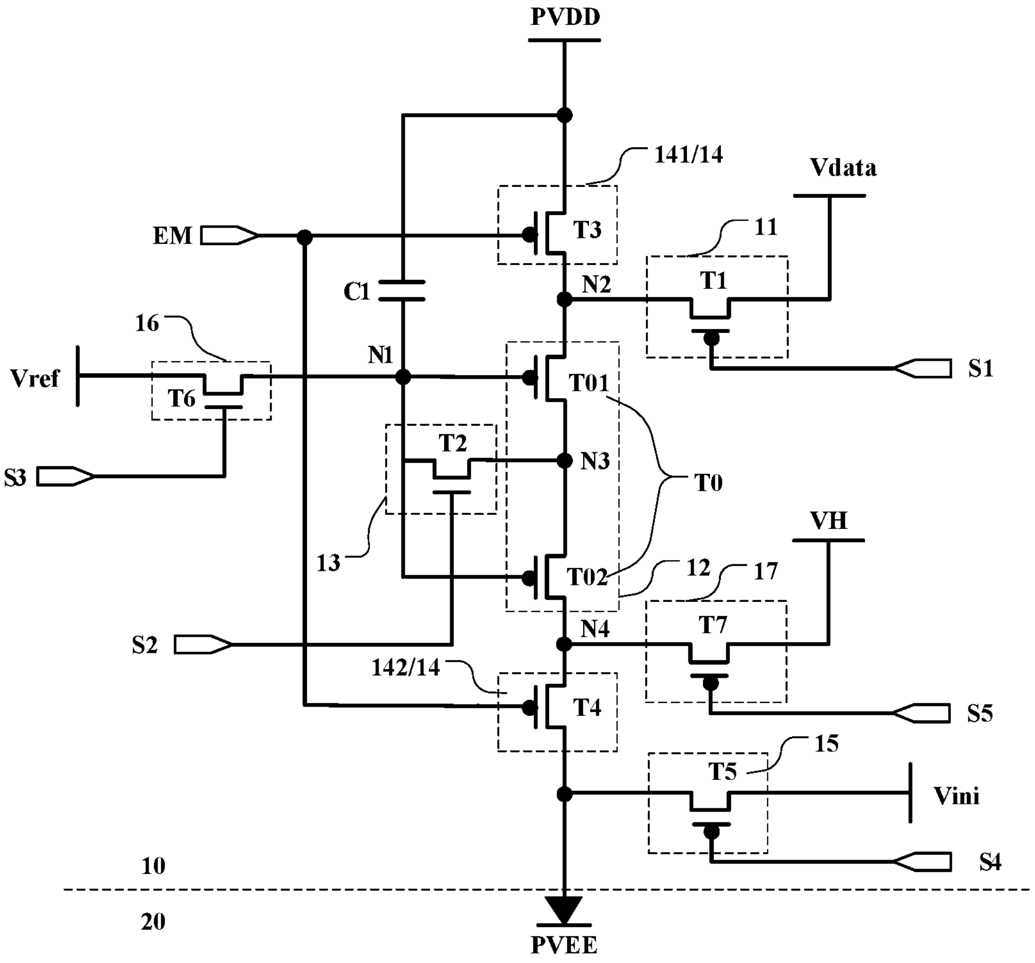
FIG. 13 illustrates a schematic diagram of a pixel circuit of another exemplary display panel consistent with disclosed embodiments of the present disclosure.
Figure 14:
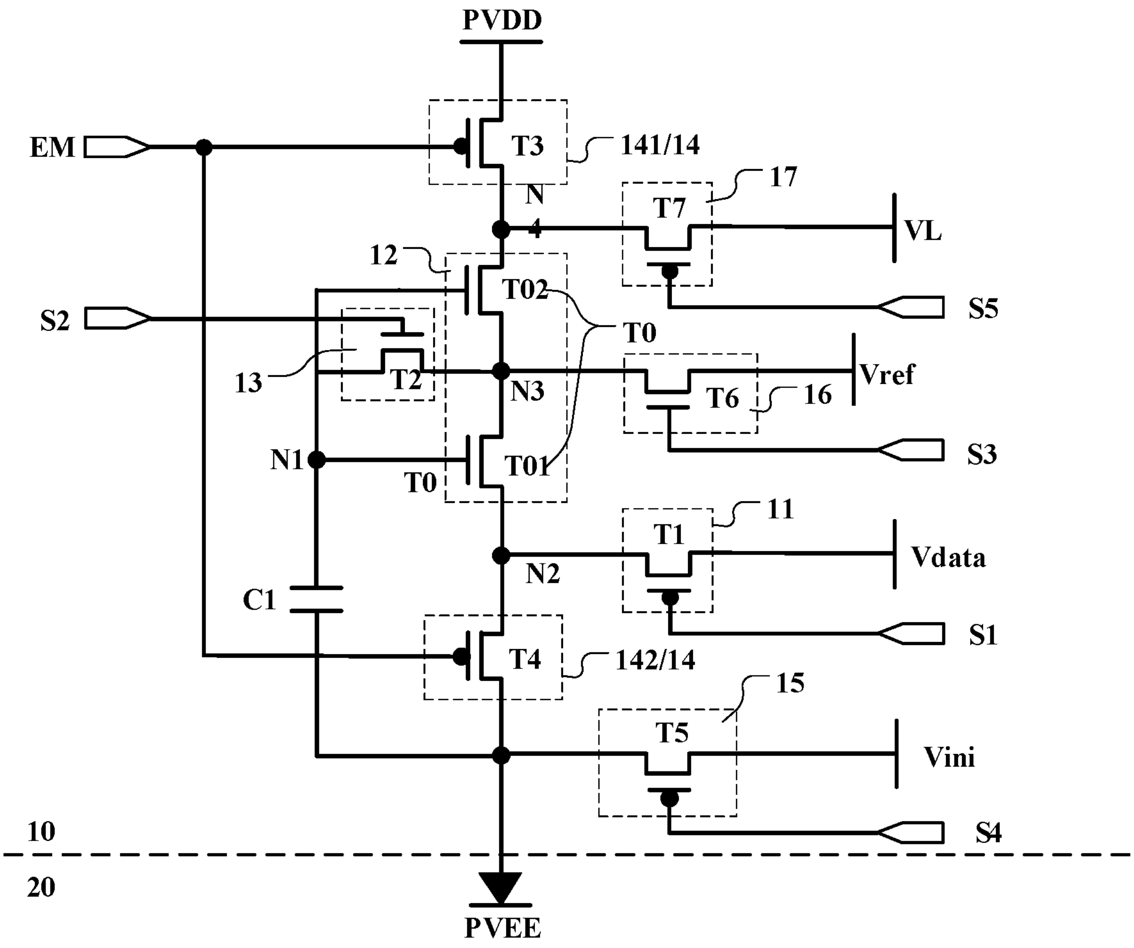
FIG. 14 illustrates a schematic diagram of a pixel circuit of another exemplary display panel consistent with disclosed embodiments of the present disclosure.

FIG. 13 illustrates a schematic diagram of a pixel circuit of another display panel consistent with disclosed embodiments of the present disclosure; and FIG. 14 illustrates a schematic diagram of a pixel circuit of another display panel consistent with disclosed embodiments of the present disclosure. Optionally, referring to FIG. 13 and FIG. 14, the pixel circuit 10 may include a bias adjustment module 17. One end of the bias adjustment module 17 may be connected to a bias adjustment signal terminal for receiving a bias adjustment signal, the other end of the bias adjustment module 17 may be connected to the second drain 104 (node N4) of the driving transistor T0, and the control terminal of the bias adjustment module 17 may be connected to a bias control signal line S5 for receiving a bias control signal.

The working process of the pixel circuit may include a bias adjustment stage. In the bias adjustment stage, the bias adjustment module 17 may be turned on, the compensation module 13 may be turned off, and the bias adjustment signal may be transmitted to the second drain of the driving transistor T0. Because in the light-emitting stage, the voltage difference between the second drain and the gate may be substantially large, which may cause a substantially large electric field strength of the second driving portion. In one embodiment, to further improve such problem, the first bias adjustment module 17 may be connected to the second drain 104. The bias adjustment module 17 may be configured to provide the bias adjustment signal to the second drain 104 in the bias adjustment stage, to reduce the voltage difference between the second drain and the gate, or to reverse the direction of the electric field between the second drain and the gate, to cancel out the problem of deviation of the threshold voltage of the driving transistor caused by the electric field between the gate and the second drain during the light-emitting stage.

Optionally, the bias adjustment module 17 may include a seventh transistor T7. A source of the seventh transistor T7 may be connected to the bias adjustment signal terminal, a drain of the seventh transistor T7 may be connected to the second drain 104 (node N4) of the driving transistor T0, and a gate of the seventh transistor T7 may be connected to the bias control signal line S5.

Optionally, referring to FIG. 13, the driving transistor T0 may be a PMOS transistor, and the bias adjustment signal may be a high voltage signal VH. Because when the driving transistor is a PMOS transistor, in the light-emitting stage, the voltage of the source of the driving transistor may often be substantially high, followed by the gate, and then the second drain. The voltage of the second drain may often be substantially low. To cancel out the deviation of the threshold voltage caused by substantially low voltage of the second drain, the bias adjustment signal may be set to be the high voltage signal VH, to adjust the strength of the electric field or even cancel out the electric field between the second drain and the gate as soon as possible in the bias adjustment stage.

Referring to FIG. 14, the driving transistor T0 may be an NMOS transistor, and the bias adjustment signal may be a low voltage signal VL. Because when the driving transistor is an NMOS transistor, in the light-emitting stage, the voltage of the source of the driving transistor may often be substantially low, followed by the gate, and then the second drain. The voltage of the second drain may often be substantially high. To cancel out the problem of the deviation of the threshold voltage caused by the substantially high voltage of the second drain, the bias adjustment signal may be set to be the low voltage signal VL, to adjust the strength of the electric field or even cancel out the electric field between the second drain and the gate as soon as possible in the bias adjustment stage.

The present disclosure also provides a display panel. The display panel may include a pixel circuit 10 and a light-emitting element 20. The pixel circuit 10 may include a data-writing module 11, a driving module 12, and a compensation module 13. The data-writing module 11 may be configured to selectively provide a data signal for the driving module 12. The driving module 12 may be configured to provide a driving current for the light-emitting element 20, and the driving module 12 may include a driving transistor T0. The compensation module 13 may be configured to compensate a threshold voltage of the driving transistor T0. The driving transistor T0 may include a source 102, a gate 101, an active layer 105, a first drain 103 and a second drain 104. A first driving portion T01 may be disposed between the source 102 and the first drain 103, and a second driving portion T02 may be disposed between the first drain 103 and the second drain 104. A length of a channel region of the first driving portion T01 may be L1, and a length of a channel region of the second driving portion T02 may be L2.

In one embodiment, the data-writing module 11 may be connected to the source 102, the compensation module 13 may be connected between the gate 101 and the first drain 103, and $L2/L1 \geq \Delta Vsd2/(\Delta Vsg+V0)-1$ and $0 \leq V0 \leq 2V$; in another embodiment, the data-writing module 11 may be connected to the first drain 103, the compensation module 13 may be connected between the gate 101 and the second drain 104, and $L1/L2 \geq \Delta Vsd2/(\Delta Vgd2+V0)-1$ and $0 \leq V0 \leq 2V$, where $\Delta Vsd2=|Vs-Vd2|$, $\Delta Vsg=|Vs-Vg|$, and $\Delta Vgd2=|Vg-Vd2|$. In a light-emitting stage of the light-emitting element, Vs may be a voltage of the source of the driving transistor, Vd2 may be a voltage of the second drain of the driving transistor, and Vg may be a voltage of the gate of the driving transistor.

In one embodiment, $0 \leq V0 \leq 2V$ may be defined. In other words, for the pixel circuit in the present disclosure, when $0 \leq \Delta Vgd1 \leq 2V$, the strength of electric field between the gate 101 and the first drain 103 may be reduced to a certain extent, such that the deviation ΔV of the threshold voltage of the driving transistor T0 caused by the electric field between the gate 101 and the first drain 103 may be controlled within 100 mV as much as possible, to avoid the deviation of the threshold voltage from significantly affecting the data-writing stage and to avoid flickering problem.

Under such premise, V0 may be further reduced within $0 \leq V0 \leq 1.5V$, $0 \leq V0 \leq 1V$, $0 \leq V0 \leq 0.5V$, etc. Specifically, V0 may be one of 2V, 1.8V, 1.5V, 1.2V, 1.0V, 0.8V, 0.6V, 0.4V, 0.2V, 0V, etc. A reasonable V0 value may be selected according to the specific situation in practical applications.

In addition, other implementation manners may refer to the above-mentioned implementation manners, all of which may be applied here, and the details may not be repeated herein.

Figure 15:
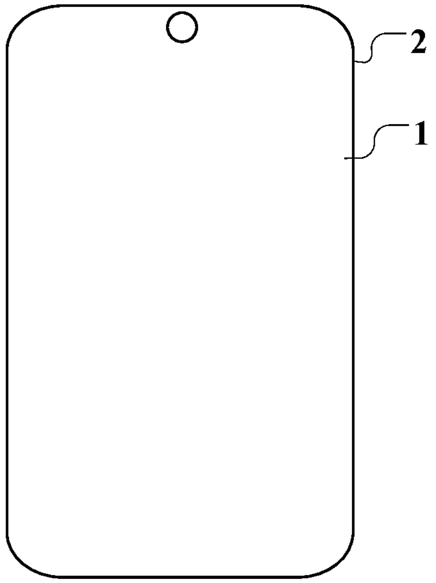
FIG. 15 illustrates a schematic diagram of an exemplary display device consistent with disclosed embodiments of the present disclosure.

The present disclosure may also provide a display device. FIG. 15 illustrates a schematic top view of a display device consistent with disclosed embodiments of the present disclosure. Referring to FIG. 15, the display device 2 may include a display panel 1. The display panel 1 may include a display panel in any one of the disclosed embodiments. The display device 2 may be one of a variety of display devices such as a TV, a notebook, a mobile phone, and a smart wearable display device, etc., which may not be limited by the present disclosure.

The display panel and display device in the present disclosure may at least include following beneficial effects. In the present disclosure, the driving transistor may be divided into the first driving portion and the second driving portion. In the data-writing stage, one of the first driving portion between the source and the first drain and the second driving portion between the first drain and the second drain may not participate in the data-writing stage. Further, the voltage difference between the first drain and the gate may be set within the range of V0, and V0 may often be set to be less than half of ΔVgd2 or half of ΔVsg. Therefore, the voltage difference between the first drain and the gate may be reduced to within half of the original voltage difference between the gate and the source or within half of the original voltage difference between the gate and the second drain. Thus, the potential difference between the first drain or source and the gate may be reduced, thereby reducing the deviation of the threshold voltage of at least one of the first driving portion and the second driving portion. One of the first driving portion and the second driving portion may participate in the data-writing stage, while the other may not participate in the data-writing stage, such that the time length required to overcome the error when the display panel is refreshed may be improved, the flickering problem may be reduced, and the display effect may be improved.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A display panel, comprising:

a pixel circuit and a light-emitting element, wherein:

the pixel circuit includes a data-writing module, a driving module, and a compensation module;

the data-writing module is configured to selectively provide a data signal for the driving module;

the driving module includes a driving transistor and is configured to provide a driving current to the light-emitting element;

the compensation module is configured to compensate a threshold voltage of the driving transistor;

a source of the driving transistor includes a first source and a second source, and a drain of the driving transistor includes a first drain and a second drain;

a third driving portion is arranged between the first source and the second source, a first driving portion is arranged between the second source and the first drain, and a second driving portion is arranged between the first drain and the second drain; and the data writing module is connected to the second source, and the compensation module is connected between a gate and the first drain.

2. The display panel according to claim 1, wherein:

a length of a channel region of the first driving portion is L1, a length of a channel region of the second driving portion is L2, and a length of a channel region of the third driving portion is L3;

$L3/(L1+L2) \geq \Delta Vs1d2/(\Delta Vgd2+V0)-1$ and $0 \leq V0 \leq \Delta Vs1g \times 1/2$; or $L2/(L1+L3) \geq \Delta Vs1d2/(\Delta Vs1g+V0)-1$ and $0 \leq V0 \leq \Delta Vgd2 \times 1/2$;

wherein $\Delta Vs1d2=|Vs1-Vd2|$, $\Delta Vs1g=|Vs1-Vg|$, and $\Delta Vgd2=|Vg-Vd2|$, in a light-emitting stage of the light-emitting element, Vs1 is a voltage of the first source of the driving transistor, Vd2 is a voltage of the second drain of the driving transistor, and Vg is a voltage of the gate of the driving transistor.

3. The display panel according to claim 2, wherein:

$L3/(L1+L2) \geq \Delta Vs1d2/(\Delta Vgd2+V1)-1$; and $L2/(L1+L3) \geq \Delta Vs1d2/(\Delta Vs1g+V1)-1$, wherein $0 \leq V1 \leq 2V$.

4. The display panel according to claim 1, wherein:

a channel region of an active layer includes a first segment, a second segment, a first site between the first segment and the second segment, the first drain is connected to the first site, the first segment is located at the first driving portion, and the second segment is located at the second driving portion, wherein:

the gate includes a first side surface, the first side surface being a side surface of the gate closest to the first site, wherein:

at least a partial region of the first segment has a distance away from the first side surface of the gate greater than a distance between the first site and the first side surface; and/or at least a partial region of the second segment has a distance away from the first side surface of the gate greater than the distance between the first site and the first side surface.

5. The display panel according to claim 4, wherein:

the gate further includes a second side surface, the second side surface is connected to the first side surface, and the first side surface and the second side surface are two side surfaces of the gate closest to the first site, wherein:

at least a partial region of the first segment has a distance away from the second side surface of the gate greater than a distance between the first site and the second side surface; and/or at least a partial region of the second segment has a distance away from the second side surface of the gate greater than the distance between the first site and the second side surface.

6. The display panel according to claim 4, wherein:

the first site does not overlap with the gate.

7. The display panel according to claim 4, wherein:

a length of a channel region of the first driving portion is L1, and a length of a channel region of the second driving is L2; and an auxiliary channel region is arranged between the first site and the first drain, a length of the auxiliary channel region is L0, wherein $0 \leq L0 \leq (L1+L2)/30$.

8. The display panel according to claim 1, wherein:

the driving transistor is a PMOS transistor or an NMOS transistor.

9. A display device comprising a display panel including:

a pixel circuit and a light-emitting element, wherein:

the pixel circuit includes a data-writing module, a driving module, and a compensation module;

the data-writing module is configured to selectively provide a data signal for the driving module;

the driving module includes a driving transistor and is configured to provide a driving current to the light-emitting element;

the compensation module is configured to compensate a threshold voltage of the driving transistor;

a source of the driving transistor includes a first source and a second source, and a drain of the driving transistor includes a first drain and a second drain;

a third driving portion is arranged between the first source and the second source, a first driving portion is arranged between the second source and the first drain, and a second driving portion is arranged between the first drain and the second drain; and the data writing module is connected to the second source, and the compensation module is connected between a gate and the first drain.

10. The device according to claim 9, wherein:

a length of a channel region of the first driving portion is L1, a length of a channel region of the second driving portion is L2, and a length of a channel region of the third driving portion is L3;

$L3/(L1+L2) \geq \Delta Vs1d2/(\Delta Vgd2+V0)-1$ and $0 \leq V0 \leq \Delta Vs1g \times 1/2$; or $L2/(L1+L3) \geq \Delta Vs1d2/(\Delta Vs1g+V0)-1$ and $0 \leq V0 \leq \Delta Vgd2 \times 1/2$;

wherein $\Delta Vs1d2=|Vs1-Vd2|$, $\Delta Vs1g=|Vs1-Vg|$, and $\Delta Vgd2=|Vg-Vd2|$, in a light-emitting stage of the light-emitting element, Vs1 is a voltage of the first source of the driving transistor, Vd2 is a voltage of the second drain of the driving transistor, and Vg is a voltage of the gate of the driving transistor.

11. The device according to claim 10, wherein:

$L3/(L1+L2) \geq \Delta Vs1d2/(\Delta Vgd2+V1)-1$; and $L2/(L1+L3) \geq \Delta Vs1d2/(\Delta Vs1g+V1)-1$, wherein $0 \leq V1 \leq 2V$.

12. The device according to claim 9, wherein:

a channel region of an active layer includes a first segment, a second segment, a first site between the first segment and the second segment, the first drain is connected to the first site, the first segment is located at the first driving portion, and the second segment is located at the second driving portion, wherein:

the gate includes a first side surface, the first side surface being a side surface of the gate closest to the first site, wherein:

at least a partial region of the first segment has a distance away from the first side surface of the gate greater than a distance between the first site and the first side surface; and/or at least a partial region of the second segment has a distance away from the first side surface of the gate greater than the distance between the first site and the first side surface.

13. The device according to 12, wherein:

the gate further includes a second side surface, the second side surface is connected to the first side surface, and the first side surface and the second side surface are two side surfaces of the gate closest to the first site, wherein:

at least a partial region of the first segment has a distance away from the second side surface of the gate greater than a distance between the first site and the second side surface; and/or at least a partial region of the second segment has a distance away from the second side surface of the gate greater than the distance between the first site and the second side surface.

14. The device according to claim 12, wherein:

the first site does not overlap with the gate.

15. The device according to claim 12, wherein:

a length of a channel region of the first driving portion is L1, and a length of a channel region of the second driving is L2; and an auxiliary channel region is arranged between the first site and the first drain, a length of the auxiliary channel region is L0, wherein 0≤L0≤(L1+L2)/30.

16. The device according to claim 9, wherein:

the driving transistor is a PMOS transistor or an NMOS transistor.

* * * * *